(12) United States Patent
Shrestha et al.

(10) Patent No.: US 12,526,730 B2
(45) Date of Patent: Jan. 13, 2026

(54) TECHNIQUES FOR COMMUNICATING SATELLITE REVISIT TIME IN A NON-TERRESTRIAL NETWORK

(71) Applicant: QUALCOMM Incorporated, San Diego, CA (US)

(72) Inventors: Bharat Shrestha, San Diego, CA (US); Liangping Ma, San Diego, CA (US); Mungal Singh Dhanda, Slough (GB); Umesh Phuyal, San Diego, CA (US); Xiao Feng Wang, San Diego, CA (US); Ayan Sengupta, San Diego, CA (US); Alberto Rico Alvarino, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 627 days.

(21) Appl. No.: 18/045,950

(22) Filed: Oct. 12, 2022

(65) Prior Publication Data

US 2023/0121634 A1    Apr. 20, 2023

Related U.S. Application Data

(60) Provisional application No. 63/256,396, filed on Oct. 15, 2021.

(51) Int. Cl.
*H04W 48/10* (2009.01)
*H04B 7/185* (2006.01)

(52) U.S. Cl.
CPC ........ *H04W 48/10* (2013.01); *H04B 7/18513* (2013.01)

(58) Field of Classification Search
CPC ............ H04B 7/18513; H04B 7/18519; H04B 7/18515; H04B 7/18534; H04B 7/18517;
(Continued)

(56) References Cited

U.S. PATENT DOCUMENTS

| 10,181,896 B1* | 1/2019 | Swift ................. H04B 7/18519 |
| 2015/0222294 A1* | 8/2015 | Eroz ..................... H03M 13/27 |
| | | 714/776 |
| 2023/0043459 A1* | 2/2023 | Shrestha ............... H04W 76/30 |

FOREIGN PATENT DOCUMENTS

| EP | 4037201 A1 | 8/2022 |
| WO | WO-2017143388 A1 | 8/2017 |

(Continued)

OTHER PUBLICATIONS

International Search Report and Written Opinion—PCT/US2022/078060—ISA/EPO—Jan. 13, 2023.

*Primary Examiner* — Khalid W Shaheed
(74) *Attorney, Agent, or Firm* — Holland & Hart LLP

(57) ABSTRACT

Methods, systems, and devices for wireless communications are described. A user equipment (UE) may be configured to receive control signaling indicating a satellite visit time associated with one or more satellites. The UE may be configured to operate in an idle state, an inactive state, or a power-saving state for a time interval which is based on the satellite visit time. The UE may then be configured to monitor for one or more broadcast signals associated with the one or more satellites, one or more network entities, or both, following an end of the time interval which is based on the satellite visit time.

28 Claims, 11 Drawing Sheets

(58) Field of Classification Search
CPC .. H04B 7/18521; H04B 7/18523; H04B 7/19; H04B 7/18528; H04W 48/10; H04W 84/06

See application file for complete search history.

(56) References Cited

FOREIGN PATENT DOCUMENTS

| | | |
|---|---|---|
| WO | WO-2021162609 A1 | 8/2021 |
| WO | WO-2022117339 A1 | 6/2022 |

* cited by examiner

_US 12,526,730 B2_

TECHNIQUES FOR COMMUNICATING SATELLITE REVISIT TIME IN A NON-TERRESTRIAL NETWORK

CROSS REFERENCE

The present Application for Patent claims the benefit of U.S. Provisional Patent Application No. 63/256,396 by SHRESTHA et al., entitled "TECHNIQUES FOR COMMUNICATING SATELLITE REVISIT TIME IN A NON-TERRESTRIAL NETWORK," filed Oct. 15, 2021, assigned to the assignee hereof, and expressly incorporated by reference herein.

FIELD OF TECHNOLOGY

The following relates to wireless communications, including techniques for communicating satellite revisit time in a non-terrestrial network (NTN).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Non-terrestrial networks (NTNs) may employ a satellite or other overhead node that communicates (e.g., transmits, receives) with user equipments (UEs). Serving cells for satellites in an NTN may be much larger than serving cells in terrestrial wireless communications systems, and may move relative to the Earth as the satellites orbit the Earth.

SUMMARY

The described techniques relate to improved methods, systems, devices, and apparatuses that support techniques for communicating satellite revisit time in a non-terrestrial network (NTN). Generally, aspects of the present disclosure may support techniques which enable a user equipment (UE) to identify a time at which the UE may be able to establish a wireless connection with a next visiting satellite of an NTN. In particular, aspects of the present disclosure support techniques which enable the network to indicate a "satellite visit time" for one or more satellites of an NTN, where the satellite visit time indicates a time at which a next "visiting satellite" will be in a position to provide wireless communications to the UE. For example, a UE may receive an indication of a satellite visit time from an NTN or a terrestrial network, and may enter an idle state, an inactive state, and/or another power-saving state (e.g., low-power state) based on the indicated satellite visit time. In such cases, the UE may "wake up" and perform one or more actions at or around the satellite visit time. For example, at or around the satellite visit time, the UE may select a cell and begin monitoring for paging messages, transition to an active state to establish a wireless communication with the next visiting satellite, monitor for paging messages while in the idle state, or any combination thereof. Such techniques may enable UEs to conserve power during periods of time in which the UEs are unable to communicate with the NTN.

A method for wireless communication at a UE is described. The method may include receiving control signaling indicating a satellite visit time associated with one or more satellites, operating in an idle state, an inactive state, or a power-saving state for a time interval which is based on the satellite visit time, and monitoring for one or more broadcast signals associated with the one or more satellites, one or more network entities, or both, following an end of the time interval which is based on the satellite visit time.

An apparatus for wireless communication at a UE is described. The apparatus may include a processor, memory coupled with the processor, and instructions stored in the memory. The instructions may be executable by the processor to cause the apparatus to receive control signaling indicating a satellite visit time associated with one or more satellites, operate in an idle state, an inactive state, or a power-saving state for a time interval which is based on the satellite visit time, and monitor for one or more broadcast signals associated with the one or more satellites, one or more network entities, or both, following an end of the time interval which is based on the satellite visit time.

Another apparatus for wireless communication at a UE is described. The apparatus may include means for receiving control signaling indicating a satellite visit time associated with one or more satellites, means for operating in an idle state, an inactive state, or a power-saving state for a time interval which is based on the satellite visit time, and means for monitoring for one or more broadcast signals associated with the one or more satellites, one or more network entities, or both, following an end of the time interval which is based on the satellite visit time.

A non-transitory computer-readable medium storing code for wireless communication at a UE is described. The code may include instructions executable by a processor to receive control signaling indicating a satellite visit time associated with one or more satellites, operate in an idle state, an inactive state, or a power-saving state for a time interval which is based on the satellite visit time, and monitor for one or more broadcast signals associated with the one or more satellites, one or more network entities, or both, following an end of the time interval which is based on the satellite visit time.

Some examples of the method, apparatuses, and non-transitory computer-readable medium described herein may further include operations, features, means, or instructions for receiving, via the control signaling, a reference time associated with the satellite visit time, or a reference location associated with the satellite visit time, or both, where the satellite visit time indicates a time of a subsequent visiting satellite of an NTN relative to the reference time, or a location of the subsequent visiting satellite relative to the reference location, or both, where monitoring for the one or more broadcast signals may be based on the reference time, the reference location, or both.

Some examples of the method, apparatuses, and non-transitory computer-readable medium described herein may further include operations, features, means, or instructions for monitoring for the one or more broadcast signals based on a comparison of an identified location associated with the UE and the reference location.

In some examples of the method, apparatuses, and non-transitory computer-readable medium described herein, the reference time includes a cell termination time associated with a cell of the NTN, a system frame number (SFN) associated with the NTN, or both.

In some examples of the method, apparatuses, and non-transitory computer-readable medium described herein, the reference location includes a location of a beam center associated with a beam used by the NTN to transmit the control signaling, a reference geographical location, or both.

Some examples of the method, apparatuses, and non-transitory computer-readable medium described herein may further include operations, features, means, or instructions for receiving, via the control signaling, an elevation angle associated with the satellite visit time, where the satellite visit time indicates an elevation of a subsequent visiting satellite of an NTN relative to the elevation angle, where monitoring for the one or more broadcast signals may be based on the elevation angle.

Some examples of the method, apparatuses, and non-transitory computer-readable medium described herein may further include operations, features, means, or instructions for receiving, via the control signaling, an indication of a set of multiple satellite visit times associated with an NTN, the set of multiple satellite visit times including the satellite visit time, where monitoring for the one or more broadcast signals may be based on the set of multiple satellite visit times.

Some examples of the method, apparatuses, and non-transitory computer-readable medium described herein may further include operations, features, means, or instructions for receiving, via the control signaling, an indication of a second satellite visit time of the set of multiple satellite visit times, wherein the second satellite visit time is subsequent to the satellite visit time, where the second satellite visit time includes a time offset relative to the satellite visit time.

Some examples of the method, apparatuses, and non-transitory computer-readable medium described herein may further include operations, features, means, or instructions for receiving, via the control signaling, an indication of one or more parameters associated with each satellite visit time of the set of multiple satellite visit times, the one or more parameters including a reference time, a reference location, an elevation angle, a physical cell identifier (PCID), a satellite identifier, a public land mobile network (PLMN), a terrestrial gateway, or any combination thereof.

Some examples of the method, apparatuses, and non-transitory computer-readable medium described herein may further include operations, features, means, or instructions for identifying an absence of signals associated with the NTN based on monitoring for the one or more broadcast signals, operating in one of the idle state, the inactive state, or the power-saving state for a second time interval which may be based on a second satellite visit time included within the set of multiple satellite visit times, and monitoring for one or more broadcast signals associated with the one or more satellites, the one or more network entities, or both, following an end of the second time interval which may be based on the second satellite visit time.

Some examples of the method, apparatuses, and non-transitory computer-readable medium described herein may further include operations, features, means, or instructions for transmitting a request for the satellite visit time, a location report associated with the UE, or both, where the control signaling may be received in response to the request, the location report, or both.

Some examples of the method, apparatuses, and non-transitory computer-readable medium described herein may further include operations, features, means, or instructions for transmitting, via the location report, discontinuous coverage information associated with the UE, where receiving the control signaling may be based on the discontinuous coverage information.

Some examples of the method, apparatuses, and non-transitory computer-readable medium described herein may further include operations, features, means, or instructions for verifying that the control signaling was received from an NTN based on a cyclic redundancy check (CRC), a signature check, or both, where operating in one of the idle state, the inactive state, or the power-saving state may be based on the verifying.

Some examples of the method, apparatuses, and non-transitory computer-readable medium described herein may further include operations, features, means, or instructions for receiving, via the control signaling, an indication of an uncertainty period associated with the satellite visit time, where monitoring for the one or more broadcast signals may be based on the uncertainty period.

In some examples of the method, apparatuses, and non-transitory computer-readable medium described herein, the satellite visit time may be associated with a first satellite corresponding to a first PLMN of an NTN and the method, apparatuses, and non-transitory computer-readable medium may include further operations, features, means, or instructions for monitoring for the one or more broadcast signals for at least the uncertainty period following the end of the time interval, identifying an absence of signals associated with the NTN based on the monitoring for at least the uncertainty period, and monitoring for one or more broadcast signals associated with a second satellite corresponding to a second PLMN based on identifying the absence of signals.

Some examples of the method, apparatuses, and non-transitory computer-readable medium described herein may further include operations, features, means, or instructions for monitoring for the one or more broadcast signals for at least the uncertainty period following the end of the time interval, identifying an absence of signals associated with an NTN based on the monitoring for at least the uncertainty period, and performing one or more procedures associated with establishing a wireless connection with the NTN or another wireless communications network based on identifying the absence of signals.

In some examples of the method, apparatuses, and non-transitory computer-readable medium described herein, the one or more procedures include a registration update procedure, a network detachment and attachment procedure upon detecting signals associated with the NTN or the other wireless communications network, or both.

In some examples of the method, apparatuses, and non-transitory computer-readable medium described herein, the one or more procedures include a search procedure for one or more PLMNs that may be different from a PLMN associated with the one or more satellites, a search procedure for one or more wireless devices that support a radio access technology (RAT) that may be different from a RAT supported by the one or more satellites, an estimation procedure for estimating an additional satellite visit time, or any combination thereof.

In some examples of the method, apparatuses, and non-transitory computer-readable medium described herein, the uncertainty period includes a time duration, a number of paging cycles, a number of discontinuous reception (DRX) cycles, or any combination thereof.

Some examples of the method, apparatuses, and non-transitory computer-readable medium described herein may further include operations, features, means, or instructions for identifying a set of multiple candidate satellites of an NTN based on the monitoring, selecting a satellite from the set of multiple candidate satellites based on one or more parameters associated with the set of multiple candidate satellites, the UE, or both, and communicating with the selected satellite.

In some examples of the method, apparatuses, and non-transitory computer-readable medium described herein, the one or more parameters include a location of the UE, a serving time associated with each respective candidate satellite of the set of multiple candidate satellites, a signal strength or quality associated with signals received from each respective candidate satellite of the set of multiple candidate satellites, or any combination thereof.

In some examples of the method, apparatuses, and non-transitory computer-readable medium described herein, the control signaling includes system information which may be broadcast by an NTN, a radio resource control (RRC) message received when the UE may be in a connected state, a non-access stratum (NAS) message received when the UE may be in the connected state, or any combination thereof.

In some examples of the method, apparatuses, and non-transitory computer-readable medium described herein, the control signaling includes an RRC release message configured to release the UE from an active state to the idle state, the inactive state, or the power-saving state and operating in one of the idle state, the inactive state, or the power-saving state may be based on receiving the RRC release message.

In some examples of the method, apparatuses, and non-transitory computer-readable medium described herein, the satellite visit time includes a coordinated universal time associated with a subsequent visiting satellite of an NTN.

In some examples of the method, apparatuses, and non-transitory computer-readable medium described herein, the satellite visit time may be associated with a subsequent visiting satellite of an NTN and the method, apparatuses, and non-transitory computer-readable medium may include further operations, features, means, or instructions for receiving the control signaling via a first satellite of the NTN, where the subsequent visiting satellite includes the first satellite or a second satellite of the NTN which may be different from the first satellite.

DETAILED DESCRIPTION

Figure 1:
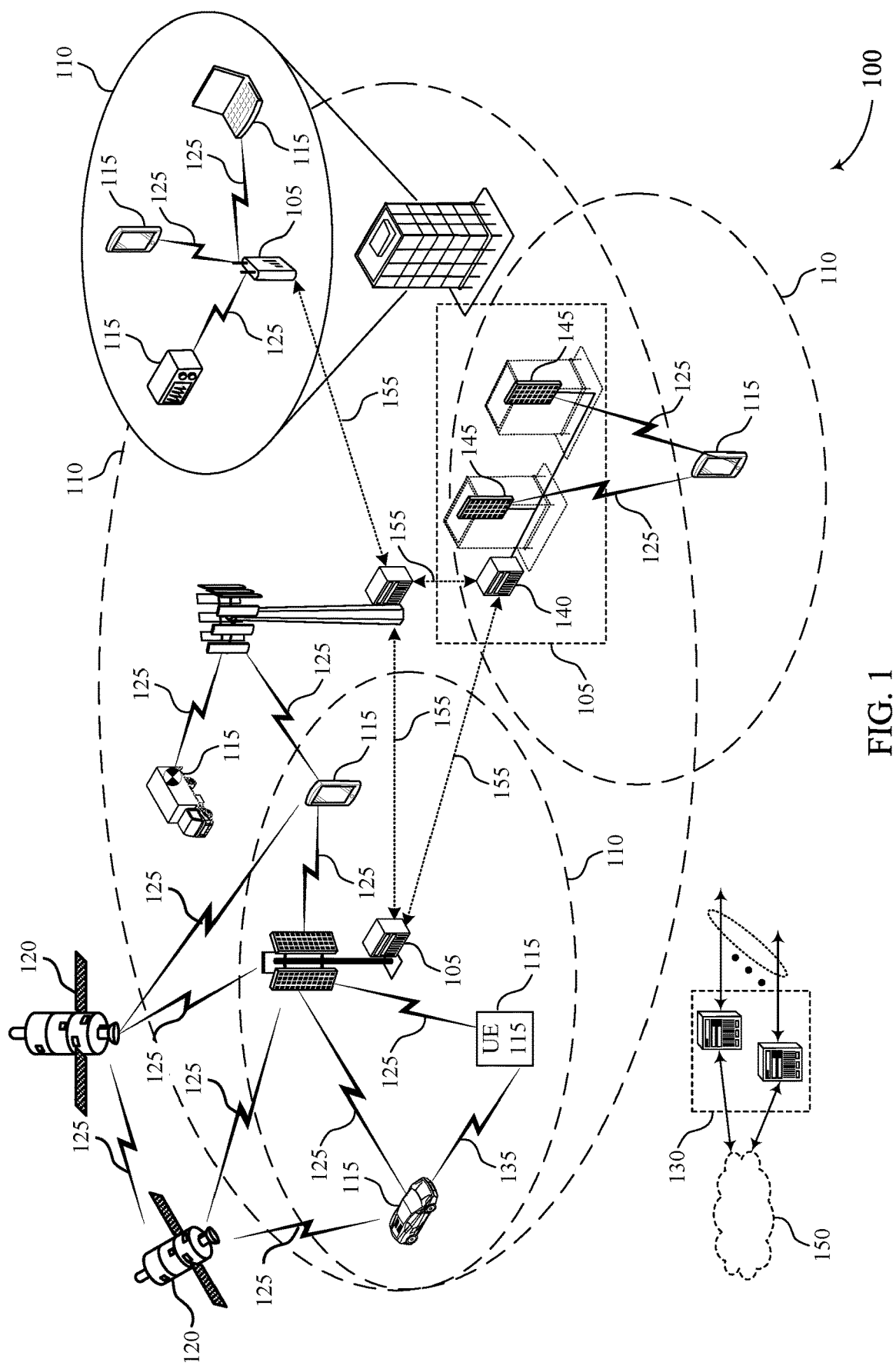
FIG. 1 illustrates an example of a wireless communications system that supports techniques for communicating satellite revisit time in a non-terrestrial network (NTN) in accordance with aspects of the present disclosure.

Non-terrestrial networks (NTNs) may employ a satellite or other overhead node that communicates (e.g., transmits, receives) with user equipments (UEs). Serving cells for satellites in an NTN may be much larger than serving cells in terrestrial wireless communications systems. Moreover, serving cells for satellites may move relative to the Earth as the satellites orbit the Earth. However, in some NTNs (e.g., NTNs with small quantities of satellites), radio coverage may not be continuous. As a result, UEs may experience discontinuous network coverage as satellites (and corresponding serving cells) move relative to the Earth. For example, a UE which is originally within a serving cell of a first satellite may lose connection with the NTN at a first time as the first satellite orbits the Earth and moves away from the UE, and may be unable to re-establish a connection with the NTN until a second time at which a second satellite moves into a position to serve the UE. In this example, the performance of cell search procedures at the UE between the first time and the second time may be futile, and may result in wasted power and decreased battery life at the UE.

Accordingly, aspects of the present disclosure support techniques which may enable UEs to identify a time at which the UE may be able to establish a wireless connection with a next visiting satellite of an NTN. In particular, aspects of the present disclosure may support techniques which enable a network (e.g., NTN, terrestrial network) to indicate a "satellite visit time" for one or more satellites of an NTN, where the satellite visit time indicates a time at which a next "visiting satellite" will be in a position to provide wireless communications to the UE.

For example, a UE may receive an indication of a satellite visit time from the NTN and/or terrestrial network (e.g., network entity or base station), and may enter an idle state, an inactive state, and/or a power-saving state (e.g., low-power state) for the NTN based on the satellite visit time. In such cases, the UE may "wake up" and perform one or more actions at or around (e.g., within a defined period before or after) the satellite visit time. For example, at or around the satellite visit time, the UE may select a cell and begin monitoring for paging messages, transition to an active state to establish a wireless communication with the next visiting satellite, monitor for paging messages while in the idle state, or any combination thereof. For example, in some aspects, the UE may "wake up" (e.g., transition back to an active state) at or around the satellite visit time in order to establish a wireless connection with the next visiting satellite corresponding to the satellite visit time. Such techniques may enable UEs to conserve power during periods of time in which the UEs will be unable to communicate with the NTN.

In some implementations, each satellite of an NTN may broadcast a corresponding satellite visit time (e.g., via system information such as but not limited to a system information block (SIB)). In other cases, the NTN may transmit dedicated signaling to each respective UE which indicates a satellite visit time for the respective UE (e.g., via radio resource control (RRC) signaling, such as RRCReleaseMessaging). For example, in some cases, a UE may be able to request a satellite visit time from the NTN. The satellite visit time may be signaled/identified relative to a reference position and/or a reference location. In some cases, the NTN may include an "uncertainty period" along with the satellite visit time, where the uncertainty period indicates a duration of time that the UE should search for a satellite after waking up for the satellite visit time.

As used herein, an active state may refer to an RRC active state or RRC connected state (e.g., RRC CONNECTED or NR-RRC CONNECTED), for example where the UE operates according to a connected mode. An active state may also refer to other states having the characteristics or performing the operations described herein for an active state. Examples of characteristics or operations performed by a UE operating in an active state (e.g., connected state) include an established connection for one or both a control or user plane between a 5G core (5GC) and network entity or base station (e.g., radio access network for 5G radio access network (RAN) (NG-RAN)); the UE access stratum (AS) context being stored in the network entity or base station (e.g., NG-RAN) and the UE; network entity or base station (e.g., NG-RAN) knowing the cell to which the UE belongs; transferring/communicating unicast data to and from the UE; and network controlled mobility including measurements. In some cases, a UE operating in an active state may provide channel quality and feedback information. In some cases, a UE operating in an active state may perform neighboring cell measurements and measurement reporting. In some cases, a UE operating in an active state may acquire system information. In some cases, a UE operating in an active state may perform immediate 3GPP-defined minimization of drive test (MDT) measurement together with available location reporting.

As used herein, an inactive state may refer to an RRC inactive state (e.g., RRC INACTIVE or NR-RRC INACTIVE), for example where the UE operates according to a connected mode. An inactive state may also refer to other states having the characteristics or performing the operations described herein for an inactive state. Examples of characteristics or operations performed by a UE operating in an inactive state include broadcasting system information by the network entity or base station; cell re-selection mobility; paging is initiated by the network entity or base station (e.g., NG-RAN) (RAN paging); RAN-based notification area (RNA) is managed by NG-RAN; discontinuous reception (DRX) for RAN paging configured by NG-RAN; 5GC to NG-RAN connection (one or both of control and user planes) is established for UE; the UE AS context is stored in NG-RAN and the UE; and NG-RAN knows the RNA to which the UE belongs. In some cases, a UE operating in an inactive state may acquires system information and can send a system information request. In some cases, a UE operating in an inactive state may perform logging of available measurements. In some cases, a UE operating in an inactive state may perform logging of available measurements together with location and time. In some cases, a UE operating in an inactive state may perform idle/inactive measurements.

As used herein, an idle state may refer to an RRC idle state (e.g., RRC idle or NR-RRC IDLE), for example where the UE operates according to an idle mode. An idle state may also refer to other states having the characteristics or performing the operations described herein for an idle state. Examples of characteristics or operations performed by a UE operating in an idle state include public land mobile network (PLMN) selection; broadcast of system information; cell re-selection mobility; paging for mobile terminated data is initiated by 5GC; paging for mobile terminated data area is managed by 5GC; and discontinuous reception for core network paging configured by non-access stratum. In some cases, a UE operating in an idle state may acquire system information and can send a system information request. In some cases, a UE operating in an idle state may perform logging of available measurements. In some cases, a UE operating in an idle state may perform logging of available measurements together with location and time. In some cases, a UE operating in an idle state may perform idle/inactive measurements.

On power up, a UE may enter an idle (e.g., disconnected) state, where the UE may not yet be registered with the network in some examples. The UE may then perform an attach procedure to enter an active (e.g., and connected) state. The connected state may be suspended, where the UE enters an inactive (e.g., and connected) state. That is, when the RRC connection for a UE is suspended, the UE may store the UE Inactive AS context and any configuration received from a network entity or base station (e.g., NG-RAN). In some cases, the resumption of a suspended RRC connection may be initiated when the UE needs to transit from an inactive state to an active state. In the active state and inactive state, the UE may still be registered with and connected to the network. The UE may be resumed and return to the active state from the inactive state. However, if the connection with the network (e.g., to a network entity or to the base station) fails, the UE may return to the idle state from the inactive state. Similarly, while the UE is in the active state, the UE may return to the idle state if the UE detaches, or if the connection with the network (e.g., to a network entity or to the base station) fails.

The UE may also operate in idle mode DRX, or connected mode DRX. In idle mode DRX, while in an idle state, the UE periodically wakes up to monitor for paging messages and goes back to sleep mode if a paging message is not intended for the UE according to a DRX cycle. In connected mode DRX, while in a connected state, the UE may transition between DRX active state and DRX sleep state according to a DRX cycle (e.g., either long cycle type, or short cycle type), monitoring for physical downlink control channel (PDCCH) during the DRX active state.

Aspects of the disclosure are initially described in the context of wireless communications systems. Aspects of the disclosure are additionally described in the context of an example process flow. Aspects of the disclosure are further illustrated by and described with reference to apparatus diagrams, system diagrams, and flowcharts that relate to techniques for communicating satellite revisit time in an NTN.

FIG. 1 illustrates an example of a wireless communications system 100 that supports techniques for communicating satellite revisit time in an NTN in accordance with aspects of the present disclosure. The wireless communications system 100 may include one or more network entities (e.g., one or more base stations 105), one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

Network entities including but not limited to base stations 105 may be dispersed throughout a geographic area to form the wireless communications system 100 and may be devices in different forms or having different capabilities. In various examples, a network entity may be referred to as a network element, a mobility element, a radio access network (RAN) node, or network equipment, among other nomenclature. In some examples, network entities (e.g., base stations 105) and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities (e.g., base stations 105), or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 155 (e.g., via an S1, N2, N3, or other interface protocol). The base stations 105 may communicate with one another over the backhaul links 155 (e.g., via an X2, Xn, or other interface protocol) either directly (e.g., directly between base stations 105), or indirectly (e.g., via core network 130), or both. In some examples, network entities (e.g., base stations 105) may communicate with one another via a midhaul communication link (e.g., in accordance with a midhaul interface protocol) or a fronthaul communication link (e.g., in accordance with a fronthaul interface protocol), or any combination thereof. The backhaul communication links 155, midhaul communication links, or fronthaul communication links may be or include one or more wired links (e.g., an electrical link, an optical fiber link), one or more wireless links. (e.g., a radio link, a wireless optical link), among other examples or various combinations thereof. A UE 115 may communicate with the core network 130 through a communication link.

One or more of the network entities described herein may include or may be referred to as a base stations 105 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity (e.g., base station 105) may be implemented in an aggregated (e.g., monolithic, standalone) base station architecture, which may be configured to utilize a protocol stack that is physically or logically integrated within a single network entity (e.g., a single RAN node, such as a base station 105).

In some examples, a network entity (e.g., base station 105) may be implemented in a disaggregated architecture (e.g., a disaggregated base station architecture, a disaggregated RAN architecture), which may be configured to utilize a protocol stack that is physically or logically distributed among two or more network entities, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity may include one or more of a central unit (CU), a distributed unit (DU), a radio unit (RU), a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof. An RU may also be referred to as a radio head, a smart radio head, a remote radio head (RRH), a remote radio unit (RRU), or a transmission reception point (TRP). One or more components of the network entities (e.g., base stations 105) in a disaggregated RAN architecture may be co-located, or one or more components of the network entities (e.g., base stations 105) may be located in distributed locations (e.g., separate physical locations). In some examples, one or more network entities (e.g., base stations 105) of a disaggregated RAN architecture may be implemented as virtual units (e.g., a virtual CU (VCU), a virtual DU (VDU), a virtual RU (VRU)).

The split of functionality between a CU, a DU, and an RU is flexible and may support different functionalities depending upon which functions (e.g., network layer functions, protocol layer functions, baseband functions, RF functions, and any combinations thereof) are performed at a CU, a DU, or an RU. For example, a functional split of a protocol stack may be employed between a CU and a DU such that the CU may support one or more layers of the protocol stack and the DU may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU may be connected to one or more DUs or RUs, and the one or more DUs or RUs may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU. Additionally, or alternatively, a functional split of the protocol stack may be employed between a DU and an RU such that the DU may support one or more layers of the protocol stack and the RU may support one or more different layers of the protocol stack. The DU may support one or multiple different cells (e.g., via one or more RUs). In some cases, a functional split between a CU and a DU, or between a DU and an RU may be within a protocol layer (e.g., some functions for a protocol layer may be performed by one of a CU, a DU, or an RU, while other functions of the protocol layer are performed by a different one of the CU, the DU, or the RU). A CU may be functionally split further into CU control plane (CU-CP) and CU user plane (CU-UP) functions. A CU may be connected to one or more DUs via a midhaul communication link (e.g., F1, F1 c, F1 u), and a DU may be connected to one or more RUs via a fronthaul communication link (e.g., open fronthaul (FH) interface). In some examples, a midhaul communication link or a fronthaul communication link may be implemented in accordance with an interface (e.g., a channel) between layers of a protocol stack supported by respective network entities (e.g., base stations 105) that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities (e.g., base stations 105) and/or IAB nodes may be partially controlled by each other. One or more IAB nodes may be referred to as a donor entity or an IAB donor. One or more DUs or one or more RUs may be partially controlled by one or more CUs associated with a donor network entity (e.g., a donor base station 105). The one or more donor network entities (e.g., donor base stations 105 or IAB donors) may be in communication with one or more additional network entities (e.g., additional base stations 105 or IAB nodes) via supported access and backhaul links (e.g., backhaul communication links 155). IAB nodes may include an IAB mobile termination (IAB-MT) controlled (e.g., scheduled) by DUs of a coupled IAB donor. An IAB-MT may include an independent set of antennas for relay of communications with UEs 115, or may share the same antennas (e.g., of an RU) of an IAB node used for access via the DU of the IAB node (e.g., referred to as virtual IAB-MT (vIAB-MT)). In some examples, the IAB nodes may include DUs that support communication links with additional entities (e.g., IAB nodes, UEs 115) within the relay chain or configuration of the access network (e.g., downstream). In such cases, one or more components of the disaggregated RAN architecture (e.g., one or more IAB nodes or components of IAB nodes) may be configured to operate according to the techniques described herein.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the network entities (e.g., base stations 105) may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (RAT) (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a network entity (e.g., base station 105), or downlink transmissions from a network entity (e.g., base station 105) to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity (e.g., base station 105), satellite 120, or both, may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity (e.g., base station 105) may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity (e.g., a base station 105, an RU, etc.) may be movable and therefore provide communication coverage for a moving geographic coverage area 110. In some examples, different geographic coverage areas 110 associated with different technologies may overlap, but the different geographic coverage areas 110 may be supported by the same network entity. In other examples, the overlapping geographic coverage areas 110 associated with different technologies may be supported by different network entities. The wireless communications system 100 may include, for example, a heterogeneous network in which different types of the network entities provide coverage for various geographic coverage areas 110 using the same or different radio access technologies.

Some UEs 115 may be configured to employ operating modes (e.g., power-saving state) that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity (e.g., base station 105). Other UEs 115 in such a group may be outside the geographic coverage area 110 of a network entity (e.g., base station 105) or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity (e.g., a base station 105), may include subcomponents such as an access network entity 140, which may be an example of an access node controller (ANC). Each access network entity 140 may communicate with the UEs 115 through one or more other access network transmission entities 145, such as an RU may also be referred to as a radio head, a smart radio head, an RRH, an RRU, or TRP. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity (e.g., base station 105) or a UE 115 may be equipped with multiple antennas, which may be used to employ techniques such as transmit diversity, receive diversity, multiple-input multiple-output (MIMO) communications, or beamforming. The antennas of a network entity (e.g., base station 105) or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities (e.g., base stations 105) or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a network entity (e.g., base station 105) in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by network entity (e.g., base station 105) in different directions and may report to the network entity (e.g., base station 105) an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity (e.g., base station 105), such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may also include one or more satellites 120. A satellite 120 may communicate with base stations 105, which may be referred to as gateways in an NTN, and UEs 115, which may include other high altitude or terrestrial communications devices. In some examples, a satellite 120 itself may be an example of a base station 105. A satellite 120 may be any suitable type of communication satellite configured to relay or otherwise support communications between different devices in the wireless communications system 100. A satellite 120 may be an example of a space satellite, a balloon, a dirigible, an airplane, a drone, an unmanned aerial vehicle, or other vehicle which may support communications from a generally non-terrestrial, overhead, or elevated position. In some examples, a satellite 120 may be in a geosynchronous or geostationary earth orbit, a low earth orbit, or a medium earth orbit. A satellite 120 may be a multi-beam satellite configured to provide service for multiple service beam coverage areas in a configured geographical service area. The satellite 120 may be any distance away from the surface of the earth or other reference surface.

In some examples, a cell may be provided or established by a satellite 120 as part of an NTN. A satellite 120 may, in some cases, perform the functions of a base station 105, act as a bent-pipe satellite, or act as a regenerative satellite, or a combination thereof. In some examples, a satellite 120 may be an example of a smart satellite, or a satellite with intelligence or other communications processing capability. For example, a smart satellite may be configured to perform more functions than a regenerative satellite (e.g., may be configured to perform particular algorithms beyond those used in regenerative satellites, to be reprogrammed). In a bent-pipe transponder configuration, a satellite 120 may be configured to receive signals from ground stations (e.g., gateways, base stations 105, a core network 130) and transmit those signals to different ground stations or terminals (e.g., UEs 115, base stations 105). In some cases, a satellite 120 supporting a bent-pipe transponder configuration may amplify signals or shift from uplink frequencies to downlink frequencies. In some examples, a satellite 120 supporting a regenerative transponder configuration may relay signals like a bent-pipe transponder configuration, but may also use on-board processing to perform other functions. Examples of these other functions may include demodulating a received signal, decoding a received signal, re-encoding a signal to be transmitted, modulating the signal to be transmitted, or a combination thereof. In some examples, a satellite 120 supporting a bent pipe transponder configuration or regenerative transponder configuration may receive a signal from a base station 105 and may relay the signal to a UE 115 or base station 105, or vice-versa.

In accordance with examples as disclosed herein, the UEs 115, base stations 105, and satellites 120 of the wireless communications system 100 may be configured to support techniques which may enable UEs 115 to identify a time at which the UE 115 may be able to establish a wireless connection with a next visiting satellite of an NTN. In particular, aspects of the present disclosure may support techniques which enable a network (e.g., base station 105, satellite 120) to indicate a "satellite visit time" for one or more satellites of an NTN, where the satellite visit time indicates a time at which a next "visiting satellite" will be in a position to provide wireless communications to the UE 115.

For example, a UE 115 of the wireless communications system 100 may receive an indication of a satellite visit time from a satellite 120 and/or base station 105 of the wireless communications system 100, and may enter an idle state, an inactive state, and/or another power-saving state (e.g., low-power state) for the NTN based on the satellite visit time. The satellite visit time may indicate a time in which a next visiting satellite 120 will be in a position to communicate with the UE 115. In such cases, the UE 115 may "wake up" and perform one or more actions at or around the satellite visit time. For example, at or around the satellite visit time, the UE 115 may select a cell and begin monitoring for paging messages, transition to an active state to establish a wireless communication with the next visiting satellite, monitor for paging messages while in the idle state, or any combination thereof. For example, in some aspects, the UE 115 may "wake up" (e.g., transition back to an active state) at or around the satellite visit time in order to establish a wireless connection with the next visiting satellite corresponding to the satellite visit time. Such techniques may enable UEs 115 to conserve power during periods of time in which the UEs 115 will be unable to communicate with the NTN.

In some implementations, each satellite 120 of an NTN may broadcast a corresponding satellite visit time (e.g., via system information). In other cases, the NTN may transmit dedicated signaling to each respective UE 115 which indicates a satellite visit time for the respective UE 115 (e.g., via RRC signaling, such as RRCReleaseMessaging). For example, in some cases, a UE 115 may be able to request a satellite visit time from the NTN. The satellite visit time may be signaled/identified relative to a reference position and/or a reference location. In some cases, the network of the wireless communications system 100 (e.g., base station 105, satellite 120) may include an "uncertainty period" along with the satellite visit time, where the uncertainty period indicates a duration of time that the UE 112 should search for a satellite after waking up for the satellite visit time.

Techniques described herein may support signaling which enable UEs 115 to determine satellite visit times (e.g., satellite revisit times) associated with one or more satellites 120 of an NTN. By enabling UEs 115 to determine satellite visit times, techniques described herein may enable UEs 115 to enter idle/inactive states during periods of time in which the UEs 115 will be unable to communicate with the NTN, which may reduce power consumption and improve battery life of the UEs 115. Moreover, techniques described herein may enable UEs 115 to perform one or more actions upon a satellite visit time in order to establish (e.g., re-establish) wireless communications with the NTN, which may further improve power consumption at the UE 115 and lead to a more efficient use of wireless resources.

Figure 2:
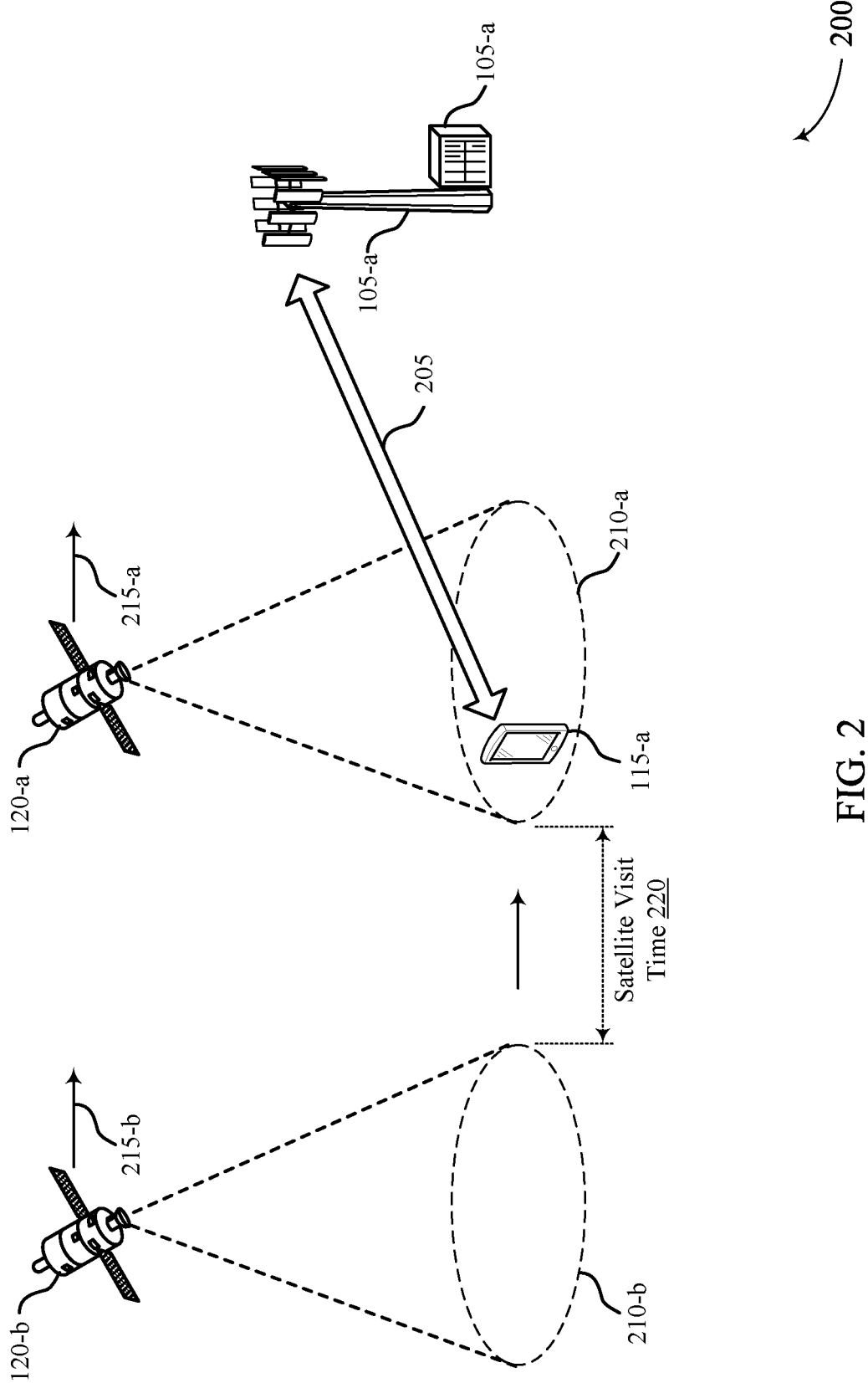
FIG. 2 illustrates an example of a wireless communications system that supports techniques for communicating satellite revisit time in an NTN in accordance with aspects of the present disclosure.

FIG. 2 illustrates an example of a wireless communications system 200 that supports techniques for communicating satellite revisit time in an NTN in accordance with aspects of the present disclosure. In some examples, the wireless communications system 200 may implement aspects of the wireless communications system 100. For example, wireless communications system 200 may support techniques for signaling satellite visit times associated with one or more satellites 120 of an NTN, as described with reference to FIG. 1.

The wireless communications system 200 may include a UE 115-*a*, a base station 105-*a*, and one or more satellites 120 (e.g., first satellite 120-*a*, second satellite 120-*b*). In this regard, the wireless communications system 200 may include an example of an NTN. The UE 115 may communicate with the base station 105-*a* using one or more communication links. For example, the UE 115-*a* may communicate with the base station 105-*a* via a communication link 205. In some cases, the communication link 205 may include an example of an access link (e.g., Uu link). The communication link 205 may include a bi-directional link that can include both uplink and downlink communication. For example, the UE 115-*a* may transmit uplink transmissions, such as uplink control signals or uplink data signals, to the base station 105-*a* via communication link 205, and the base station 105-*a* may transmit downlink transmissions, such as downlink control signals or downlink data signals, to the UE 115-*a* via the communication link 205. Similarly, the UE 115-*a* may communicate with the respective satellites 120-*a*, 120-*b* using one or more communication links, which may support both uplink and downlink communications.

The satellites 120-*a*, 120-*b* may be configured to support communications over geographic coverage areas 210-*a*, 210-*b*. The geographic coverage areas 210-*a* may be located at a relatively fixed location (e.g., when the satellites 120-*a*, 120-*b* are in a geostationary orbit or otherwise generally fixed overhead location), or may move or sweep across locations (e.g., as a moving geographic coverage area, such as when the satellites 120-*a*, 120-*b* are in a low-earth orbit or medium earth orbit, or is otherwise moving overhead). For example, as shown in FIG. 2, the first satellite 120-*a* and the second satellite 120-*b* may move along directions of movement 215-*a* and 215-*b*, respectively, such that the coverage areas 210-*a*, 210-*b* move relative to Earth (and the UE 115-*a* and/or base station 105-*b*) based on the directions of movement 215-*a*, 215-*b*.

In some examples, the satellites 120-*a*, 120-*b* may be examples of, or may be configured to operate as, smart satellites, where the satellites 120-*a*, 120-*b* support a capability for processing communications associated with the respective coverage areas 210-*a*, 210-*b* (e.g., uplink communications, downlink communications, or both). In examples where the satellites 120-*a*, 120-*b* are configured to operate as smart satellites, the satellites 120-*a*, 120-*b* may be examples of base stations 105 as described herein (e.g., where the satellites 120-*a*, 120-*b* operate as a gNB or other type of base station), and the satellites 120-*a*, 120-*b* may or may not communicate with a core network via the gateway.

In some examples, the satellites 120-*a*, 120-*b* may be examples of, or may be configured to operate as, bent-pipe transponders or regenerative transponders, where the satellites 120-*a*, 120-*b* may operate as a relay between a gateway and one or more devices within the respective geographic coverage areas 210-*a*, 210-*b* (e.g., relaying signals received from the geographic coverage areas 210-*a*, 210-*b* over gateway communication links, relaying signals received from the gateway over gateway communication links as transmissions to devices in the geographic coverage areas 210-*a*, 210-*b*).

The satellites 120-*a*, 120-*b* may be in an orbit, such as low earth orbit, medium earth orbit, geostationary earth orbit, or other non-geostationary earth orbit. In any of these examples, the satellites 120-*a*, 120-*b* may be many thousands of kilometers from Earth, and therefore may be thousands of kilometers from the UE 115-*a*. Each transmission between the respective satellite 120 and the UE 115-*a* may therefore travel from Earth the distance to the respective satellite 120 and back to Earth.

In some aspects, the coverage area 210-*a*, 210-*b* (e.g., radio cells) of the satellites 120-*a*, 120-*b* may be significantly larger than coverage areas associated with terrestrial base stations 105 (e.g., base station 105-*a*). The satellites 120-*a*, 120-*b* may move or travel relative to fixed positions on Earth (e.g., move relative to terrestrial tracking areas). For example, when the satellite 120-*a* is in a low-earth orbit, the satellite 120-*a* may be between 600 km to 2000 km from Earth and travelling at a rate of 7.56 km/s. In this example, and assuming a diameter of 1000 km for the coverage area 210-*a*, the UE 115-*a* may be in within the coverage area 210-*a* of the satellite 120-*a* for approximately 132.2 seconds (2.2 minutes).

In this regard, the satellites 120-*a*, 120-*b* and corresponding coverage areas 210-*a*, 210-*b* may move relative to Earth over time. As such, in some NTNs (e.g., NTNs with small quantities of satellites 120), radio coverage may not be continuous at the UE 115. As a result, the UE 115-*a* may experience discontinuous network coverage as satellites 120-*a*, 120-*b* (and corresponding serving cells or coverage areas 210) move relative to the Earth. For example, as shown in FIG. 2, the UE 115-*a* may originally be within the coverage area 210-*a* of the first satellite 120-*a*, and may lose connection with the NTN at a first time as the first satellite 120-*a* orbits the Earth and moves away from the UE 115-*a*. In this example, the UE 115-*a* may experience a "coverage gap" in which the UE 115-*a* is unable to communicate with the NTN until a next satellite visit time 220. That is, the next satellite visit time 220 may correspond to a time in which a next visiting satellite 120 of the NTN moves into a position to communicate with the UE 115-*a*. The satellite visit time of an NTN may vary depending on the quantity of satellites 120 in an NTN. For example, in the case of an NTN with a single satellite 120, the satellite visit time for the single satellite may be 12-48 hours depending on the satellite orbit period. In other words, in the context of an NTN with a single satellite 120, the UE 115-*a* may have to wait 12-48 hours until it is able to re-establish a connection with the satellite.

In NTNs with larger quantities of satellites 120, the satellite visit time 220 may be anywhere from 10 to 40 minutes, depending on the quantity of satellites 120 which are deployed. The UE 115-*a* may be unreachable, or may otherwise be unable to communicate with a satellite 120 of the NTN during the satellite visit time 220. For example, as shown in FIG. 2, the satellite visit time 220 may define a duration of time between a first time in which the UE 115-*a* is no longer positioned within the first coverage area 210-*a* of the first satellite 120-*a*, and a second time in which the UE 115-*a* is positioned within the second coverage area 210-*b* of the second satellite 120-*b*. In this example, and assuming the UE 115-*a* is out of a coverage area of the base station 105-*a*, the UE 115-*a* may be unreachable from the core network (e.g., unable to communicate with the satellites 120-*a*, 120-*b* and/or base station 105-*b*) during the satellite visit time 220.

Accordingly, the wireless communications system 200 may support techniques which may enable the UE 115-*a* to identify a time at which the UE 115-*a* may be able to establish a wireless connection with a next visiting satellite 120 (e.g., satellite 120-*b*) of an NTN. In particular, aspects of the present disclosure may support techniques which enable the wireless communications system 200 (e.g., NTN, terrestrial network) to indicate a "satellite visit time" for one or more satellites 120 of an NTN, where the satellite visit time indicates a time at which a next "visiting satellite 120" (e.g., satellite 120-*b*) will be in a position to provide wireless communications to the UE 115-*a*. Indications of satellite visit times associated with satellites of an NTN may include satellite assistance information which may be used by the UE 115-*a* to predict coverage discontinuity of the NTN, reduce power consumption, and improve battery life at the UE 115-*a*. In particular, satellite assistance information (e.g., satellite visit times) may enable the UE 115-*a* to enter a lower power state (e.g., idle state, inactive state) during times in which the UE 115-*a* may be unable to communicate with the NTN, thereby preventing wasted power used for cell searches.

For example, the UE 115-*a* may transmit a location report associated with the UE 115-*a* to the base station 105-*a*, the first satellite 120-*a*, or both. In some aspects, the location report may include discontinuous coverage information associated with the UE 115-*a*. For example, in the context of an NTN, the location report may include discontinuous coverage information associated with the UE 115-*a* when communicating with the NTN.

Additionally, or alternatively, the UE 115-*a* may transmit a request for a satellite visit time 220 associated with one or more satellites 120 (e.g., satellite 120-*b*) of the NTN. The UE 115-*a* may transmit the request to the first satellite 120-*a*, the base station 105-*b*, or both. In some cases, the UE 115-*a* may transmit the request for the satellite visit time 220 based on identifying that the UE 115-*a* is moving out of the coverage area 210-*a* associated with the first satellite 120-*a*, a coverage area associated with the base station 105-*a*, or both. For example, the UE 115-*a* may identify that the first satellite 120-*a* (and therefore the coverage area 210-*a*) is moving relative to the UE 115-*a*, and that the UE 115-*a* will soon be out of the coverage area 210-*a* (and therefore unable to communicate with the first satellite 120-*a*). As such, in this example, the UE 115-*a* may transmit the request for a satellite visit time 220 based on identifying that the UE 115-*a* will be unable to communicate with the first satellite 120-*a*.

In some aspects, the UE 115-*a* may receive control signaling which indicates a satellite visit time 220 associated with one or more satellites 120 (e.g., satellite 120-*a*) of an NTN. In other words, the control signaling may indicate a time at which a subsequent visiting satellite 120 (e.g., second satellite 120-*b*) of the NTN will be in a position to communicate with the UE 115-*a*. For example, the control signaling may indicate a satellite visit time 220 associated with the satellite 120-*b*. In this example, the satellite visit time 220 may depend on the orbital time, speed, and elevation angle of the second satellite 120-*b*. The UE 115-*a* may receive the control signaling indicating the satellite visit time 220 from the first satellite 120-*a*, the base station 105-*a*, or both.

In some implementations, the UE 115-*a* may be provided with all constellation information of the NTN (e.g., information of all neighboring satellites 120 within the NTN) such that the UE 115-*a* may be able to predict the next satellite visit time 220. However, the UE 115-*a* may not always have sufficient information for predicting the next satellite visit time 220, as providing all constellation information of all satellites 120 within the NTN may incur significant signaling overhead for the wireless communications system 200. Moreover, predicting satellite visit times 220 based on constellation information may be computationally expensive for the UE 115-*a*, as the UE 115-*a* may be required to calculate a visit time for multiple satellites 120 in the NTN to determine the next applicable satellite visit time 220. Accordingly, techniques described herein may enable the network to indicate satellite visit times 220 to the UE 115-*a*, which may reduce control signaling overhead and processing requirements as compared to some other techniques. Further, due at least in part to the fact that the network/NTN may have better visibility and information regarding the position/heading of each satellite 120 in the NTN, the network may be able to more accurately predict the satellite visit time 220 as compared to the UE 115-*a*, which may further reduce power consumption at the UE 115-*a*.

While the satellite visit time 220 illustrated in FIG. 2 is shown as a time interval between coverage associated with different satellites 120, this is provided solely for illustration. In additional or alternative cases, the satellite visit time 220 may be associated with a time interval between coverage of the same satellite 120. For example, in the context of a single-satellite NTN, the satellite visit time 220 may indicate a time interval between times in which the same satellite 120 will be in a position to serve the UE 115-*a*. In such cases, the satellite visit time 220 may be referred to as a "satellite revisit time."

In some aspects, the UE 115-*a* may receive the control signaling based on (e.g., in response to) transmitting the location report, transmitting the request for the satellite visit time 220, or both. In some aspects, the control signaling may include system information which is broadcast by an NTN. For example, the first satellite 120-*a* may broadcast system information which indicates one or more satellite visit times 220 associated with one or more subsequent visiting satellites 120 of the NTN. In additional or alternative implementations, the control signaling may include a downlink message which is intended for (e.g., dedicated to) the UE 115-*a*, such as an RRC message, a NAS message, or both (e.g., RRC and/or NAS message received while the UE 115-*c* is in a connected state). In other words, the control signaling may include a unicast or groupcast message. For example, in some cases, the control signaling may include an RRC message (e.g., RRCReleaseMessage) which is configured to release the UE 115-*a* from an active state to an idle state and/or an inactive state.

The satellite visit time 220 may be indicated in a number of ways. In some cases, the satellite visit time 220 may include a Coordinated Universal Time (UTC) time associated with a subsequent visiting satellite of the NTN (e.g., satellite 120-*b*). In other cases, the control signaling may indicate reference values and other information associated with the satellite visit time 220 which may enable the UE 115-*a* to more precisely determine when and where the UE 115-*a* may be able to communicate with the subsequent visiting satellite 120-*b* of the NTN. Information associated with the satellite visit time 220 and/or subsequent visiting satellite 120-*b* which may be indicated via the control signaling may include, but is not limited to, a reference time, a reference location, an elevation angle, and the like.

For example, in some cases, the control signaling may indicate a reference time associated with the satellite visit time 220, a reference location associated with the satellite visit time 220, or both. In such cases, the satellite visit time 220 may indicate a time of the subsequent visiting satellite 120-*b* relative to the reference time and/or a location of the subsequent visiting satellite 120-*b* relative to the reference location. In some aspects, the reference time associated with the satellite visit time 220 may be indicated as a cell termination time associated with a cell of the NTN (e.g., cell termination time associated with a cell supported by the network device), a system frame number (SFN) associated with the NTN, or both. Moreover, the reference location associated with the satellite visit time 220 may be indicated as a location of a beam center associated with a beam used to transmit the control signaling (e.g., beam center of a beam used by the first satellite 120-*a*), a reference geographical location (e.g., a location of the UE 115-*a*), or both.

For instance, in the context of a fixed cell (e.g., cells of the coverage area 210-*a* are fixed until the cells are no longer supported by the satellite 120-*a*), the reference location may be indicated as location of a beam center (or reference point), where the reference time may be indicated as a cell stop time broadcast. Comparatively, in the context of a moving cell (e.g., cells constantly moving along with moving coverage area 210-*a*), the reference location may be indicated as a location of a beam center (or reference location), and the reference time may be broadcast or specified as an SFN (e.g., SFN=0, H-SFN=0). By way of another example, the control signaling may indicate an elevation angle associated with the satellite visit time 220, where the satellite visit time 220 indicates an elevation of the subsequent visiting satellite 120-*b* relative to the elevation angle (e.g., elevation angle of next visiting satellite 120-*b* with respect to the reference location).

In some cases, the control signaling may indicate a satellite visit time 220 only for the subsequent visiting satellite 120-*b* of the NTN. In other cases, the control signaling may indicate multiple satellite visit times 220 of the NTN associated with one or more subsequent visiting satellites 120. In such cases, additional satellite visit times 220 may be indicated via UTC times, via reference parameters (e.g., reference time, reference location), and/or as time offsets relative to preceding satellite visit times 220. For example, the control signaling may indicate a first satellite visit time 220 associated with the satellite 120-*b*, and a second satellite visit time 220 associated with a different subsequent visiting satellite 120. In this example, the second satellite visit time 220 may include a time offset relative to the first satellite offset time (e.g., the second satellite offset time is 40 minutes after the first satellite visit time 220).

The indication of multiple satellite visit times may be further shown and described with reference to FIG. 3.

Figure 3:
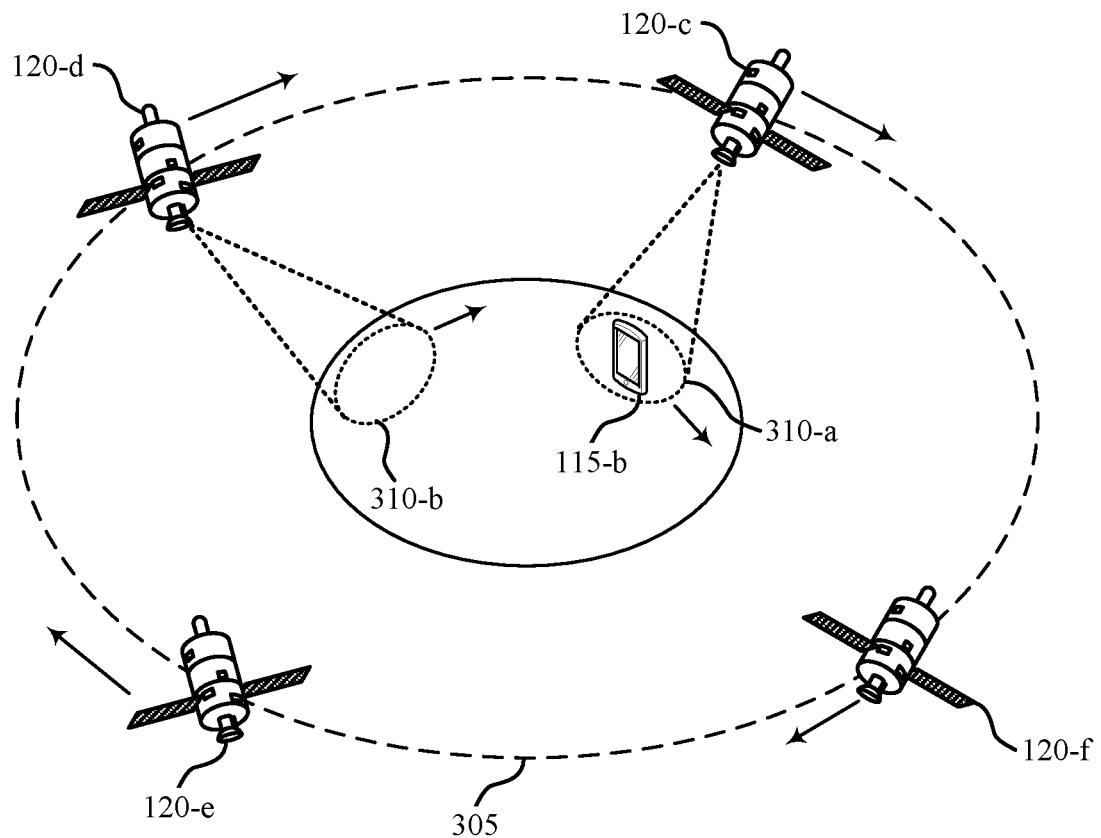
FIG. 3 illustrates an example of a wireless communications system that supports techniques for communicating satellite revisit time in an NTN in accordance with aspects of the present disclosure.

FIG. 3 illustrates an example of a wireless communications system 300 that supports techniques for communicating satellite revisit time in an NTN in accordance with aspects of the present disclosure. In some examples, the wireless communications system 300 may implement, or be implemented by, aspects of wireless communications systems 100, wireless communications system 200, or both.

The wireless communications system 300 includes a UE 115-*b* and a set of satellites 120-*c*, 120-*d*, 120-*e*, and 120-*f*. In this regard, the wireless communications system 300 may include an example of an NTN. As shown in FIG. 3, each of the satellites 120 may follow an orbital pattern 305, which is illustrated as a clockwise orbital pattern in accordance with a non-limiting example. Each respective satellite 120 may support a respective coverage area 310, which may move in relation to the orbital pattern 305 of the satellites 120.

As shown in FIG. 3, the UE 115-*b* may be positioned within a coverage area 310-*a* of the first satellite 120-*c*, and may therefore be in wireless communication with the first satellite 120-*c*. The first satellite 120-*c* may transmit control signaling to the UE 115-*b*, where the control signaling indicates a satellite visit time associated with one or more satellites 120 of the NTN. For example, in some cases, the first satellite 120-*c* may indicate a satellite visit time associated with the second satellite 120-*d*. Continuing with this example, in some cases, each satellite 120 of the wireless communications system 200 may transmit (e.g., broadcast) an indication of a satellite visit time associated with a subsequent visiting satellite 120 relative to each respective satellite 120. For example, the second satellite 120-*d* may transmit/broadcast an indication of a satellite visit time associated with the third satellite 120-*e*, the third satellite 120-*e* may transmit/broadcast an indication of a satellite visit time associated with the fourth satellite 120-*f*, and the fourth satellite 120-*f* may transmit/broadcast an indication of a satellite visit time associated with the first satellite 120-*c*.

Additionally, or alternatively, the satellites 120 of the wireless communications system 200 may transmit/broadcast indications of multiple satellite visit times. For example, the first satellite 120-*c* may transmit/broadcast an indication of multiple satellite visit times associated with multiple satellites 120 of the NTN. For instance, the first satellite 120-*c* may transmit/broadcast an indication of a first satellite visit time associated with the second satellite 120-*d*, a second satellite visit time associated with the third satellite 120-*e*, and a fourth satellite visit time associated with the fourth satellite 120-*f*. In this example, each of the respective satellite visit times may be indicated UTC times, relative to reference times/locations, and/or as time offsets relative to preceding satellite visit times. For example, continuing with the example above, the second satellite visit time associated with the third satellite 120-*e* may be indicated as a time offset relative to the first satellite visit time associated with the second satellite 120-*d*.

Moreover, in cases where the control signaling indicates one or more satellite visit times 220, the control signaling may indicate one or more parameters associated with each satellite visit time 220. Parameters associated with satellite visit times 220 may include reference times, reference locations, elevation angles, physical cell identifiers (PCIDs), satellite identifiers associated with a satellite corresponding to each respective satellite visit time 220, public land mobile networks (PLMNs), a corresponding terrestrial gateway (e.g., base station 105) associated with a satellite 120 corresponding to each respective satellite visit time 220, or any combination thereof. In some aspects, satellite visit times 220 may be broadcast for each respective PLMN (e.g., on a per-PLMN basis).

Referring back to FIG. 2, in some aspects, the control signaling which indicates the satellite visit time 220 may include an indication as to whether the satellite visit time 220 is associated with the same satellite 120 or a different satellite. For example, in cases where the UE 115-*a* receives an indication of the satellite visit time 220 from the first satellite 120-*a*, the control signaling may additionally indicate that the satellite visit time 220 is associated with the second satellite 120-*b* (as opposed to a satellite "revisit" time for the first satellite 120). Moreover, the control signaling may indicate whether the satellite visit time 220 is associated with a satellite 120 from the same or different constellation, from a same or different terrestrial gateway (e.g., base station 105), or both. Inclusion of this information associated with the satellite visit time 220 may be helpful for the UE 115-*a* to store and use for different purposes, such as synchronization signal block (SSB) searching, primary synchronization signal (PSS) searching, secondary synchronization signal (SSS) searching, and the like.

In some aspects, the control signaling indicating the satellite visit time 220 which is received by the UE 115-*a* may indicate an uncertainty period associated with the satellite visit time 220. The uncertainty period may indicate a duration of time in which the UE 115-*a* is to monitor for signals from the subsequent visiting satellite 120-*b* (or other satellite 120 of the NTN) at or around the satellite visit time 220. The uncertainty period may account for some degree of error within the estimated satellite visit time 220, as the satellite visit time 220 may not always be precise for UEs 115 at different locations and/or elevation angles. In this regard, the uncertainty period may indicate some duration of time that the UE 115-*a* is to continue monitoring for signals before/following the satellite visit time 220 in order to improve a probability that the UE 115-*a* will successfully receive signals from the NTN at or around the satellite visit time 220. The uncertainty period may be defined as a time duration (e.g., five minutes), a quantity of paging cycles, a quantity of DRX cycles, or any combination thereof.

In cases where the satellite visit information (e.g., satellite visit time 220) is broadcast, the broadcast information may not be secure. As such, the UE 115-*a* may be wrongfully attached to go to sleep due to a "fake" satellite visit time 220. Accordingly, in some implementations, the UE 115-*a* may verify that the control signaling indicating the satellite visit time 220 was transmitted by (and/or received from) a valid NTN and/or terrestrial network (e.g., via the satellite 120-*a*, base station 105-*a*). In other words, the UE 115-*a* may verify that the control signaling was transmitted by a legitimate source, rather than some malicious source which may be attempting to wrongly force the UE 115-*a* to go to sleep in response to a fake satellite visit time 220. In cases where the UE 115-*a* determines that the control signaling was received from an illegitimate source, the UE 115-*a* may discard or otherwise ignore the indicated satellite visit time 220.

In some aspects, the UE 115-*a* may verify the source of the control signaling by performing a cyclic redundancy check, a signature check, or the like. In other implementations, the UE 115-*a* may be configured to report the satellite visit time 220 back to the satellite 120-*a* and/or base station 105-*a* such that the UE 115-*a* and the satellite 120-*a*/base station 105-*a* may verify that the satellite visit time 220 is legitimate. For example, in some implementations, the UE 115-*a* may report the satellite visit time 220 to first satellite 120-*a* via a location report in which the UE 115-*a* reports its history log of discontinuous coverage. Additionally, or alternatively, the satellite visit time 220 and/or discontinuous coverage information may be reported as part of MDT reporting, via Msg5 associated with an availability of the reporting, or both.

In some aspects, the UE 115-*a* may compare its own location (e.g., identify a geographical location/position of the UE 115-*a*) associated with UE 115-*a* with the indicated location associated with the satellite visit time 220, a reference location associated with the satellite visit time 220, or both. In other words, the UE 115-*a* may compare an identified location of the UE 115-*a* with information associated with the satellite visit time 220 to determine a relative time at which the UE 115-*a* will be able to communicate with the subsequent visiting satellite 120-*b*. For example, if the UE 115-*a* is located relatively far from the indicated reference location of the satellite visit time 220, the UE 115-*a* may determine that the UE 115-*a* may not be able to communicate with the subsequent visiting satellite 120-*b* until some time before or after the indicated satellite visit time 220. As such, by comparing the location of the UE 115-*a* with the indicated location and/or reference location of the satellite visit time 220, the UE 115-*a* may determine one or more adjustments to the satellite visit time 220 in order to more accurately identify a time at which the UE 115-*a* will be able to communicate with the subsequent visiting satellite 120-*b*.

In some aspects, the UE 115-*a* may operate in an idle state, an inactive state, another power-saving state (e.g., low-power state), or any combination thereof, based on the indicated satellite visit time 220. In other words, the UE 115-*a* may transition from an active state to an idle state, an inactive state, or a power-saving state. In some aspects, the UE 115-*a* may operate in the idle/inactive/power-saving state based on receiving the control signaling which includes an RRC message that releases the UE 115-*a* to the idle/inactive/power-saving state (e.g., RRCReleaseMessage).

In particular, the UE 115-*a* may operate in the idle state, the inactive state, and/or the power-saving state for a time interval which is based on the satellite visit time 220 of the subsequent visiting satellite 120-*b*. The UE 115-*a* may operate in the idle/inactive/power-saving state in order to reduce a power consumption (and save battery life) at the UE 115-*a* during a time in which the UE 115-*a* will be unable to communicate with the base station 105-*a* and/or the satellite 120-*b*. In this regard, by indicating the satellite visit time 220 to the UE 115-*a*, techniques described herein may lead to reduced power consumption and improved battery life at the UE 115-*a*.

In some aspects, the UE 115-*a* may be configured to monitor for one or more broadcast signals associated with one or more satellites 120 of the NTN, one or more base stations 105, or both. In particular, the UE 115-*a* may be configured to monitor for broadcast signals transmitted by the next visiting satellite 120-*b* associated with the satellite visit time 220 which was indicated via the control signaling. For example, the UE 115-*a* may monitor for broadcast signals following an end of a time interval for operating in the idle/inactive/power-saving state, where the time interval is based on the satellite visit time 220. In other words, the UE 115-*a* may "wake up" at a time based on the satellite visit time 220 in order to monitor for broadcast signals.

For example, the UE 115-*a* may monitor for broadcast signals (e.g., broadcast signals from the second satellite 120-*b*) based on information associated with the satellite visit time 220 indicated via the control signaling, including a reference location, a reference time, an elevation angle, or any combination thereof. Moreover, in some aspects, the UE 115-*a* may monitor for broadcast signals based on an uncertainty period indicated via the control signaling. In particular, the UE 115-*a* may monitor for broadcast signals for at least the uncertainty period. For example, the UE 115-*a* may monitor for broadcast signals for a specified time duration a quantity of paging cycles, a quantity of DRX cycles, or any combination thereof.

The UE 115-*a* may be configured to monitor for broadcast signals while in the active state, the idle state, the inactive state, the power-saving state, or any combination thereof. For example, in some cases, the UE 115-*a* may select a cell and may monitor for paging messages from the NTN and/or a terrestrial network. By way of another example, the UE 115-*a* may monitor for broadcast signals to connect to a cell of the NTN and move to an active state. By way of yet another example, in some cases, the UE 115-*a* may select a suitable cell and may monitor for paging messages while in the idle state.

The UE 115-*a* may identify a presence (or absence) of signals (e.g., broadcast signals) received at the UE 115-*a*. In particular, the UE 115-*a* may identify whether the UE 115-*a* has received broadcast signals based on the monitoring performed at the UE 115-*a*. The actions performed by the UE 115-*a* may be based on whether or not the UE 115-*a* identifies signals received by the UE 115-*a*.

For example, in cases where the UE 115-*a* identifies broadcast signals received at the UE 115-*a*, the UE 115-*a* may establish wireless connections with a wireless device of the NTN and/or a terrestrial network. For instance, in cases where the UE 115-*a* identifies broadcast signals received from the next visiting satellite 120-*b*, the UE 115-*a* may establish wireless communications with the satellite 120-*b*. The UE 115-*a* may establish wireless communications in order to exchange uplink and/or downlink messages with the satellite 120-*b* or other wireless device. While FIG. 2 is shown and described in the context of the UE 115-*a* establishing wireless communications with the satellite 120-*b*, this is not to be regarded as a limitation of the present disclosure, unless noted otherwise herein. In particular, the UE 115-*a* may establish wireless connection with any wireless device from which the UE 115-*a* received broadcast signals. For example, the UE 115-*a* may receive signals from a base station 105-*a*, and may therefore establish wireless communications with the base station 105-*a*.

In some cases, the UE 115-*a* may receive signals (broadcast signals) from multiple wireless devices (e.g., multiple satellites 120 and/or base stations 105), and may therefore identify multiple candidate wireless devices with which the UE 115-*a* may establish wireless communications. For example, the UE 115-*a* may receive broadcast signals from multiple satellites 120 (e.g., satellite 120-*b*), and may therefore identify multiple candidate satellites 120 of the NTN with which the UE 115-*a* may communicate. In such cases, the UE 115-*a* may select a satellite 120 from the set of candidate satellites 120 based on one or more parameters of the UE 115-*a* and/or respective candidate satellites 120. Parameters which may be used to select a satellite 120 (or other wireless device) from among a set of candidate satellites 120/wireless devices may include, but are not limited to, a location of the UE 115-*a*, a location of each respective candidate satellite 120/candidate wireless device, a serving time associated with each respective candidate satellite (e.g., a time in which each candidate satellite 120 may be able to serve the UE 115-*a*), a signal strength/quality associated signals received from each respective candidate satellite 120/candidate wireless device, or any combination thereof. Upon selecting a satellite 120 or other wireless device from among the set of candidate satellites 120/candidate wireless devices, the UE 115-*a* may establish wireless communications with the selected satellite 120/selected wireless device.

Comparatively, the UE 115-*a* may be configured to perform one or more additional or alternative actions in cases where the UE 115-*a* does not identify any signals when monitoring for broadcast signals at or around the satellite visit time 220. Actions that the UE 115-*a* may take when the UE 115-*a* does not identify broadcast signals during proximate to the satellite visit time 220 may include, but are not limited to: operating in idle/inactive/power-saving state until next satellite visit time 220; search for another satellite 120 associated with a different PLMN (e.g., inform NAS and search for another PLMN); search for other RATs; estimate a new satellite visit time 220; perform registration update; detach from network and re-attach via attach request; follow existing procedure(s) for out-of-coverage scenarios, and the like.

For example, upon identifying an absence of signals received proximate to the satellite visit time 220, the UE 115-*a* may operate in an idle state, an inactive state, and/or a power-saving state. In particular, the UE 115-*a* may operate in an idle/inactive/power saving state for a time duration which is based on a satellite visit time 220 which was indicated via the control signaling. For instance, the control signaling may indicate a first satellite visit time 220 associated with the next visiting satellite 120-*b*, and may indicate a second satellite visit time 220 associated with the satellite 120-*b* and/or another satellite 120 of the NTN, where the second satellite visit time 220 is after the first satellite visit time 220. In this example, upon identifying the absence of signals received at the first satellite visit time 220, the UE 115-*a* may operate in an idle/inactive/power-saving state until the second satellite visit time 220. In other words, the UE 115-*a* may go to sleep or otherwise operate in a low power mode for a time interval which is based on the second satellite visit time 220. Subsequently, the UE 115-*a* may monitor for signals at the second satellite time in an attempt to establish a wireless connection with the NTN (and/or terrestrial network).

In additional or alternative implementations, if the UE 115-*a* does not identify signals associated with a PLMN associated with the next visiting satellite 120-*b*, the UE 115-*a* may monitor for signals (e.g., broadcast signals) from a different PLMN. For example, the UE 115-*a* may inform the non-access stratum (NAS), and begin searching for another satellite 120 or other wireless device associated with a different PLMN. Moreover, in some cases, upon identifying an absence of signals at or around the satellite visit time 220, the UE 115-*a* may search for wireless devices which support wireless communications in accordance with different RATs. For instance, in cases where the UE 115-*a* does not identify any 5G signals, the UE 115-*a* may search for satellites 120 or other wireless devices which support other RATs, including but not limited to LTE.

In additional or alternative cases, upon identifying an absence of signals at or around the satellite visit time 220, the UE 115-*a* may perform a registration update procedure. The UE 115-*a* may perform a registration update procedure to ensure that the UE 115-*a* is in sync with the core network. In this regard, the UE 115-*a* may perform the registration update procedure in an attempt to establish a wireless connection with the NTN and/or a different wireless communications network (e.g., terrestrial network). For example, the UE 115-*a* may be considered out of the registration area, and may initiate a registration update the next time the UE 115-*a* is positioned within a coverage area of the NTN or other wireless network. In this regard, the UE 115-*a* may automatically detach from the network, and transmit an attach request to re-establish a wireless connection with the network.

In additional or alternative cases, upon identifying an absence of signals at or around the satellite visit time 220, the UE 115-*a* may perform a network detachment procedure. In this regard, the UE 115-*a* may perform the network detachment procedure in an attempt to establish a wireless connection with the NTN and/or a different wireless communications network (e.g., terrestrial network). For instance, the UE 115-*a* may be considered to be detached from the network, and may initiate an attachment procedure the next time the UE 115-*a* is positioned within a coverage area of the NTN or other wireless network.

In other cases, upon identifying an absence of signals at or around the satellite visit time 220, the UE 115-*a* may follow existing procedures for handling out-of-coverage scenarios.

Techniques described herein may support signaling which enable the UE 115-*a* to determine satellite visit times 220 (e.g., satellite revisit times) associated with one or more satellites 120 of an NTN. By enabling the UE 115-*a* to determine satellite visit times 220, techniques described herein may enable the UE 115-*a* to enter idle/inactive states during periods of time in which the UE 115-*a* will be unable to communicate with the NTN, which may reduce power consumption and improve battery life of the UE 115-*a*. Moreover, techniques described herein may enable the UE 115-*a* to perform one or more actions upon a satellite visit time 220 in order to establish (e.g., re-establish) wireless communications with the NTN, which may further improve power consumption at the UE 115-*a* and lead to a more efficient use of wireless resources.

Figure 4:
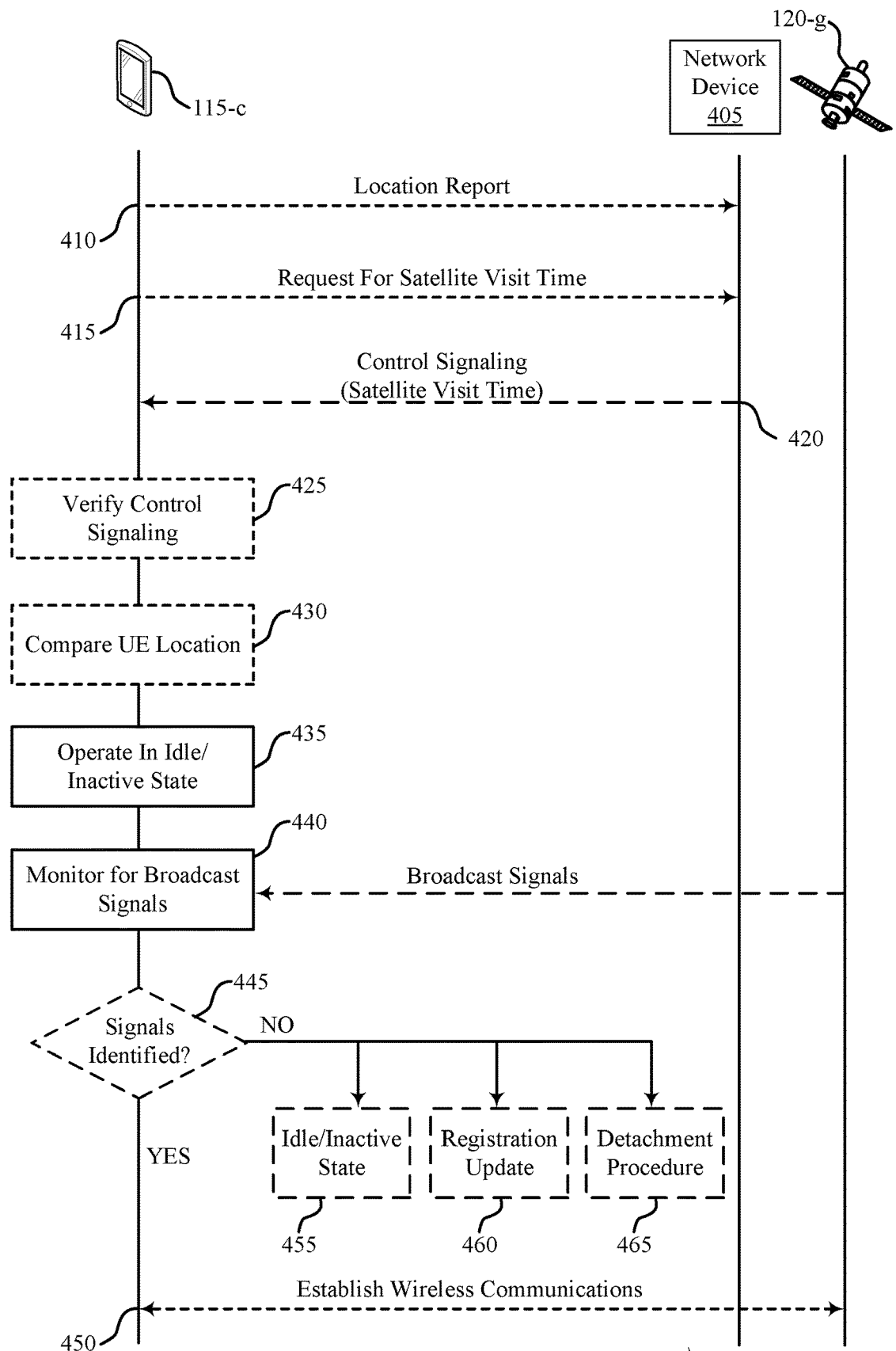
FIG. 4 illustrates an example of a process flow that supports techniques for communicating satellite revisit time in an NTN in accordance with aspects of the present disclosure.

FIG. 4 illustrates an example of a process flow 400 that supports techniques for communicating satellite revisit time in an NTN in accordance with aspects of the present disclosure. In some examples, the process flow 400 may implement, or be implemented by, aspects of wireless communications systems 100, wireless communications system 200, wireless communications system 300, or any combination thereof. For example, process flow 400 illustrates a UE 115-*c* receiving an indication of a satellite visit time, operating in an idle and/or inactive state based on the satellite visit time, and monitoring for signals from a satellite 120-*c* associated with the satellite visit time, as described with reference to FIGS. 1-3.

In some cases, process flow 400 may include a UE 115-*c*, a network device 405, and a satellite 120-*g*, which may be examples of corresponding devices as described herein. For example, the UE 115-*b* and the satellite 120-*h* illustrated in FIG. 4 may include examples of the UE 115-*a* and the satellite 120-*b*, respectively, as illustrated in FIG. 2. Moreover, the network device 405 illustrated in FIG. 4 may include an example of a base station 105, a satellite 120, or both. For example, in some cases, the network device 405 may include a base station 105 (e.g., base station 105-*a* illustrated in FIG. 2) which indicates a satellite visit time for the satellite 120-*g*. In other implementations, the network device 405 may include a satellite 120. For example, in some cases, the network device 405 may include a first satellite 120 which indicates a satellite visit time for the second satellite 120-*g*. In other cases, the network device 405 may include the satellite 120-*g*. For example, in some cases, the network device 405 may include the satellite 120-*g* which indicates a satellite visit time associated with a subsequent visiting time of the satellite 120-*g*.

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 410, the UE 115-*c* may transmit, to the network device 405, a location report associated with the UE 115-*c*. In some aspects, the location report may include discontinuous coverage information associated with the UE 115-*c*. For example, in the context of an NTN, the location report may include discontinuous coverage information associated with the UE 115-*c* when communicating with the NTN.

At 415, the UE 115-*c* may transmit, to the network device 405, a request for a satellite visit time associated with one or more satellites 120 (e.g., satellite 120-*g*) of the NTN. The UE 115-*c* may transmit the request at 415 based on transmitting the location report at 410. In some cases, the UE 115-*c* may transmit the request for the satellite visit time based on identifying that the UE 115-*c* is moving out of a coverage area associated with the network device 405. For example, in cases where the network device 405 includes a satellite 120, the UE 115-*c* may identify that the coverage area of the network device 405 is moving relative to the UE 115-*c*, and that the UE 115-*c* will soon be out of the coverage area (and therefore unable to communicate with the network device 405). As such, in this example, the UE 115-*c* may transmit the request based on identifying that the UE 115-*c* will be unable to communicate with the network device 405.

At 420, the UE 115-*c* may receive, from the network device 405, control signaling which indicates a satellite visit time associated with one or more satellites of an NTN. In other words, the control signaling may indicate a time at which a subsequent visiting satellite of the NTN will be in a position to communicate with the UE 115-*c*. For example, the control signaling may indicate a satellite visit time associated with the satellite 120-*g*. In cases where the network device 405 includes the satellite 120-*g*, the "satellite visit time" may be referred to as a "satellite revisit time." In some aspects, the UE 115-*c* may receive the control signaling based on (e.g., in response to) transmitting the location report at 410, transmitting the request at 415, or both.

In some aspects, the control signaling may include system information which is broadcast by an NTN. For example, in cases where the network device 405 includes a satellite 120 of an NTN, the network device 405 may broadcast system information which indicates one or more satellite visit times associated with one or more subsequent visiting satellites 120 of the NTN. In additional or alternative implementations, the control signaling may include a downlink message which is intended for (e.g., dedicated to) the UE 115-*c*, such as an RRC message, a NAS message, or both (e.g., RRC and/or NAS message received while the UE 115-*c* is in a connected state). In other words, the control signaling may include a unicast or groupcast message. For example, in some cases, the control signaling may include an RRC message (e.g., RRCReleaseMessage) which is configured to release the UE 115-*c* from an active state to an idle state and/or an inactive state.

The satellite visit time indicated via the control signaling may be indicated in a number of ways. In some cases, the satellite visit time may include a UTC time associated with a subsequent visiting satellite of the NTN (e.g., satellite 120-*g*). In other cases, the control signaling may indicate reference values and other information associated with the satellite visit time which may enable the UE 115-*c* to more precisely determine when and where the UE 115-*c* may be able to communicate with the subsequent visiting satellite 120-*g* of the NTN. Information associated with the satellite visit time and/or subsequent visiting satellite 120-*g* which may be indicated via the control signaling may include, but is not limited to, a reference time, a reference location, an elevation angle, and the like.

For example, in some cases, the control signaling may indicate a reference time associated with the satellite visit time, a reference location associated with the satellite visit time, or both. In such cases, the satellite visit time may indicate a time of the subsequent visiting satellite 120-*g* relative to the reference time and/or a location of the subsequent visiting satellite 120-*g* relative to the reference location. In some aspects, the reference time associated with the satellite visit time may be indicated as a cell termination time associated with a cell of the NTN (e.g., cell termination time associated with a cell supported by the network device), an SFN associated with the NTN, or both. Moreover, the reference location associated with the satellite visit time may be indicated as a location of a beam center associated with a beam used to transmit the control signaling (e.g., a beam center of a beam used by network device 405), a reference geographical location, or both. By way of another example, the control signaling may indicate an elevation angle associated with the satellite visit time, where the satellite visit time indicates an elevation of the subsequent visiting satellite 120-*g* relative to the elevation angle.

In some cases, the control signaling may indicate a satellite visit time only for the subsequent visiting satellite 120-*g* of the NTN. In other cases, the control signaling my indicate multiple satellite visit times of the NTN associated with one or more subsequent visiting satellites. In such cases, additional satellite visit times may be indicated via UTC times, via reference parameters (e.g., reference time, reference location), and/or as time offsets relative to preceding satellite visit times. For example, the control signaling may indicate a first satellite visit time associated with the satellite 120-*g*, and a second satellite visit time associated with the satellite 120-*g* and/or a different subsequent visiting satellite 120. In this example, the second satellite visit time may include a time offset relative to the first satellite offset time (e.g., the second satellite offset time is 40 minutes after the first satellite visit time).

Moreover, in cases where the control signaling indicates one or more satellite visit times, the control signaling may indicate one or more parameters associated with each satellite visit time. Parameters associated with satellite visit times may include reference times, reference locations, elevation angles, PCIDs, satellite identifiers associated with a satellite corresponding to each respective satellite visit time, PLMNs, a corresponding terrestrial gateway (e.g., base station 105) associated with a satellite corresponding to each respective satellite visit time, or any combination thereof.

In some aspects, the control signaling may indicate an uncertainty period associated with the satellite visit time. The uncertainty period may indicate a duration of time in which the UE 115-*c* is to monitor for signals from the subsequent visiting satellite 120-*g* (or other satellite 120 of the NTN) at or around the satellite visit time. The uncertainty period may account for some degree of error within the estimated satellite visit time, as the satellite visit time may not always be precise for UEs 115 at different locations and/or elevation angles. In this regard, the uncertainty period may indicate some duration of time that the UE 115-*c* is to continue monitoring for signals before/following the satellite visit time in order to improve a probability that the UE 115-*c* will successfully receive signals from the NTN at or around the satellite visit time. The uncertainty period may be defined as a time duration (e.g., five minutes), a quantity of paging cycles, a quantity of DRX cycles, or any combination thereof.

At 425, the UE 115-*c* may verify that the control signaling received at 420 was transmitted by (and/or received from) a valid NTN and/or terrestrial network. In other words, the UE 115-*c* may verify that the control signaling was transmitted by a legitimate source, rather than some malicious source which may be attempting to wrongly force the UE 115-*c* to go to sleep in response to a fake satellite visit time. In some cases, the UE 115-*c* may verify the source of the control signaling based on transmitting the location report at 410, transmitting the request at 415, receiving the control signaling at 420, or any combination thereof. In cases where the UE 115-*c* determines that the control signaling was received from an illegitimate source, the UE 115-*c* may discard or otherwise ignore the indicated satellite visit time.

In some aspects, the UE 115-*c* may verify the source of the control signaling by performing a CRC, a signature check, and the like. In other implementations, the UE 115-*c* may be configured to report the satellite revisit time back to the network device 405 such that the UE 115-*c* and the network device 405 may verify that the satellite visit time is legitimate. For example, in some implementations, the UE 115-*c* may report the satellite visit time to the network device 405 via a location report in which the UE 115-*c* reports its history log of discontinuous coverage.

At 430, the UE 115-*c* may compare its location (e.g., identify a geographical location/position of the UE 115-*c*) associated with UE 115-*c* with the indicated location associated with the satellite visit time, a reference location associated with the satellite visit time, or both. In other words, the UE 115-*c* may compare an identified location of the UE 115-*c* with information associated with the satellite visit time to determine a relative time at which the UE 115-*c* will be able to communicate with the subsequent visiting satellite 120-*g*. For example, if the UE 115-*c* is located relatively far from the indicated reference location of the satellite visit time, the UE 115-*c* may determine that the UE 115-*c* may not be able to communicate with the subsequent visiting satellite 120-*g* until some time before or after the indicated satellite visit time. As such, by comparing the location of the UE 115-*c* with the indicated location and/or reference location of the satellite visit time, the UE 115-*c* may determine one or more adjustments to the satellite visit time in order to more accurately identify a time at which the UE 115-*c* will be able to communicate with the subsequent visiting satellite 120-*g*.

At 435, the UE 115-*c* may operate in an idle state, an inactive state, a power-saving state (e.g., low power state), or any combination thereof. In other words, the UE 115-*c* may transition from an active state to an idle state, an inactive state, a power-saving state, or any combination thereof. In some aspects, the UE 115-*c* may operate in the idle state and/or the inactive state based on transmitting the location report at 410, transmitting the request at 415, receiving the control signaling at 420, verifying the source of the control signaling at 425, comparing the location of the UE 115-*c* to the satellite visit time at 430, or any combination thereof. For example, the UE 115-*c* may operate in the idle/inactive state at 435 based on receiving the control signaling which includes an RRC message that releases the UE 115-*c* to the idle/inactive state (e.g., RRCReleaseMessage).

In particular, the UE 115-*c* may operate in the idle sate, the inactive state, and/or the power-saving state for a time interval which is based on the satellite visit time of the subsequent visiting satellite 120-*g*. The UE 115-*c* may operate in the idle/inactive/power saving state in order to reduce a power consumption (and save battery life) at the UE 115-*c* during a time in which the UE 115-*c* will be unable to communicate with the network device 405 and/or the satellite 120-*g*. In this regard, by indicating the satellite visit time to the UE 115-c, techniques described herein may lead to reduced power consumption and improved battery life at the UE 115-c.

At 440, the UE 115-c may be configured to monitor for one or more broadcast signals associated with one or more satellites 120 of the NTN, one or more base stations 105, or both. In particular, the UE 115-c may be configured to monitor for one or more broadcast signals transmitted by the next visiting satellite 120-g associated with the satellite visit time which was indicated via the control signaling. For example, the UE 115-c may monitor for one or more broadcast signals following an end of a time interval for operating in the idle/inactive state, where the time interval is based on the satellite visit time. In other words, the UE 115-c may "wake up" at a time based on the satellite visit time in order to monitor for one or more broadcast signals.

In this regard, the UE 115-c may monitor for one or more broadcast signals at 440 based on transmitting the location report at 410, transmitting the request at 415, receiving the control signaling at 420, verifying the source of the control signaling at 425, comparing the location of the UE 115-c to the satellite visit time at 430, operating in idle/inactive state for the time interval which is based on the satellite visit time at 435, or any combination thereof. For example, the UE 115-c may monitor for one or more broadcast signals based on information associated with the satellite visit time indicated via the control signaling, including a reference location, a reference time, an elevation angle, or any combination thereof. Moreover, in some aspects, the UE 115-c may monitor for one or more broadcast signals based on an uncertainty period indicated via the control signaling. In particular, the UE 115-c may monitor for one or more broadcast signals for at least the uncertainty period. For example, the UE 115-c may monitor for one or more broadcast signals for a specified time duration a quantity of paging cycles, a quantity of DRX cycles, or any combination thereof.

The UE 115-c may be configured to monitor for one or more broadcast signals while in the active state, the idle state, the inactive state, or any combination thereof. For example, in some cases, the UE 115-c may select a cell and may monitor for paging messages from the NTN and/or a terrestrial network. By way of another example, the UE 115-c may monitor for one or more broadcast signals to connect to a cell of the NTN and move to an active state. By way of yet another example, in some cases, the UE 115-c may select a suitable cell and may monitor for paging messages while in the idle state.

At 445, the UE 115-c may identify a presence (or absence) of signals (e.g., one or more broadcast signals) received at the UE 115-c. In particular, the UE 115-c may identify whether the UE 115-c has received one or more broadcast signals based on the monitoring at 440. The actions performed by the UE 115-c may be based on whether or not the UE 115-c identifies signals received by the UE 115-c.

In cases where the UE 115-c identifies the presence of signals (e.g., broadcast signals) received at the UE 115-c (e.g., step 445=YES), the process flow 400 may proceed to 450.

At 450, the UE 115-c may establish wireless connections with a wireless device of the NTN and/or a terrestrial network. For example, as shown in FIG. 4 in cases where the UE 115-c identifies broadcast signals received from the next visiting satellite 120-g, the UE 115-c may establish wireless communications with the satellite 120-g. The UE 115-c may establish wireless communications in order to exchange uplink and/or downlink messages with the satellite 120-g or other wireless device. While FIG. 4 is shown and described in the context of the UE 115-c establishing wireless communications with the satellite 120-g, this is not to be regarded as a limitation of the present disclosure, unless noted otherwise herein. In particular, the UE 115-c may establish wireless connection with any wireless device from which the UE 115-c received signals at 440. For example, the UE 115-c may receive signals from a base station 105 at 440, and may therefore establish wireless communications with the base station 105 at 450.

In some cases, the UE 115-c may receive signals (broadcast signals) from multiple wireless devices (e.g., multiple satellites 120 and/or base stations 105) at 440, and may therefore identify multiple candidate wireless devices with which the UE 115-c may establish wireless communications. For example, at 440, the UE 115-c may receive broadcast signals from multiple satellites 120 (e.g., satellite 120-g), and may therefore identify multiple candidate satellites 120 of the NTN with which the UE 115-c may communicate. In such cases, the UE 115-c may select a satellite 120 from the set of candidate satellites 120 based on one or more parameters of the UE 115-c and/or respective candidate satellites 120. Parameters which may be used to select a satellite 120 (or other wireless device) from among a set of candidate satellites 120/wireless devices may include, but are not limited to, a location of the UE 115-c, a location of each respective candidate satellite 120/candidate wireless device, a serving time associated with each respective candidate satellite (e.g., a time in which each candidate satellite may be able to serve the UE 115-c), a signal strength/quality associated signals received from each respective candidate satellite 120/candidate wireless device, or any combination thereof. Upon selecting a satellite 120 or other wireless device from among the set of candidate satellites 120/candidate wireless devices, the UE 115-c may establish wireless communications with the selected satellite 120/selected wireless device, as shown and described in FIG. 4.

Reference is again made to step 445 in process flow 400. In cases where the UE 115-c identifies an absence of signals (e.g., broadcast signals) received at the UE 115-c (e.g., step 445=NO), the UE 115-c may be configured to perform one or more actions. In particular, upon identifying the absence of broadcast signals (e.g., step 445=NO), the process flow 400 may proceed to 455, 460, 465, or any combination thereof.

At 455, the UE 115-c may operate in an idle state and/or an inactive state. In particular, the UE 115-c may operate in an idle/inactive state for a time duration which is based on a satellite visit time which was indicated via the control signaling at 420.

For example, as noted previously herein, the control signaling may indicate a first satellite visit time associated with the next visiting satellite 120-g, and may indicate a second satellite visit time associated with the satellite 120-g and/or another satellite 120 of the NTN, where the second satellite visit time is after the first satellite visit time. In this example, upon identifying the absence of signals received at the first satellite time, the UE 115-c may operate in an idle/inactive state at 455 until the second satellite visit time. In other words, the UE 115-c may go to sleep or otherwise operate in a low power mode for a time interval which is based on the second satellite visit time. Subsequently, the UE 115-c may monitor for signals at the second satellite time in an attempt to establish a wireless connection with the NTN (and/or terrestrial network). In this regard, upon entering the idle/inactive state at 445, the UE 115-c may repeat steps 435-445 of process flow 400.

In additional or alternative implementations, if the UE 115-c does not identify signals associated with a PLMN associated with the next visiting satellite 120-g, the UE 115-c may monitor for signals (e.g., broadcast signals) from a different PLMN.

At 460, the UE 115-c may perform a registration update procedure. In particular, the UE 115-c may perform a registration update based on identifying an absence of signals received from the NTN at 445. In this regard, the UE 115-c may perform the registration update procedure at 460 in an attempt to establish a wireless connection with the NTN and/or a different wireless communications network (e.g., terrestrial network).

At 465, the UE 115-c may perform a network detachment procedure. In particular, the UE 115-c may perform a network detachment procedure based on identifying an absence of signals received from the NTN at 445. In this regard, the UE 115-c may perform the network detachment procedure at 465 in an attempt to establish a wireless connection with the NTN and/or a different wireless communications network (e.g., terrestrial network).

Techniques described herein may support signaling which enable the UE 115-c to determine satellite visit times (e.g., satellite revisit times) associated with one or more satellites 120 of an NTN. By enabling the UE 115-c to determine satellite visit times, techniques described herein may enable the UE 115-c to enter idle/inactive states during periods of time in which the UE 115-c will be unable to communicate with the NTN, which may reduce power consumption and improve battery life of the UE 115-c. Moreover, techniques described herein may enable the UE 115-c to perform one or more actions upon a satellite visit time in order to establish (e.g., re-establish) wireless communications with the NTN, which may further improve power consumption at the UE 115-c and lead to a more efficient use of wireless resources.

Figure 5:
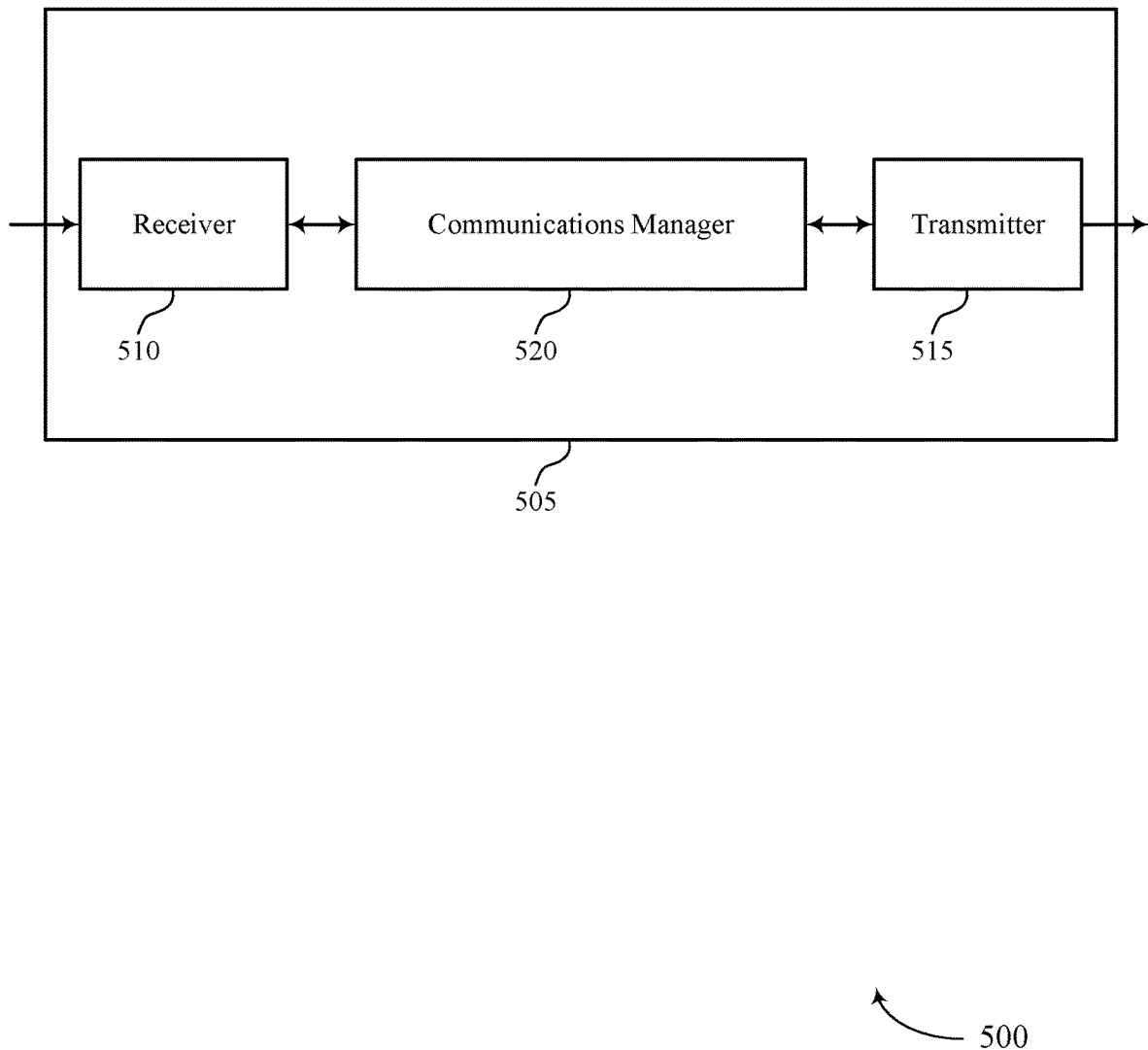
FIGS. 5 and 6 show block diagrams of devices that support techniques for communicating satellite revisit time in an NTN in accordance with aspects of the present disclosure.

FIG. 5 shows a block diagram 500 of a device 505 that supports techniques for communicating satellite revisit time in an NTN in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for communicating satellite revisit time in an NTN). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for communicating satellite revisit time in an NTN). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for communicating satellite revisit time in an NTN as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving control signaling indicating a satellite visit time associated with one or more satellites. The communications manager 520 may be configured as or otherwise support a means for operating in an idle state, an inactive state, or a power-saving state for a time interval which is based on the satellite visit time. The communications manager 520 may be configured as or otherwise support a means for monitoring for one or more broadcast signals associated with the one or more satellites, one or more base stations, or both, following an end of the time interval which is based on the satellite visit time.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for signaling which enables UEs 115 to determine satellite visit times (e.g., satellite revisit times) associated with one or more satellites 120 of an NTN. By enabling a UE 115 to determine satellite visit times, techniques described herein may enable the UEs 115 to enter idle/inactive states during periods of time in which the UE 115 will be unable to communicate with the NTN, which may reduce power consumption and improve battery life of the UE 115. Moreover, techniques described herein may enable UEs 115 to perform one or more actions upon a satellite visit time in order to establish (e.g., re-establish) wireless communications with the NTN, which may further improve power consumption at the UEs 115 and lead to a more efficient use of wireless resources.

Figure 6:
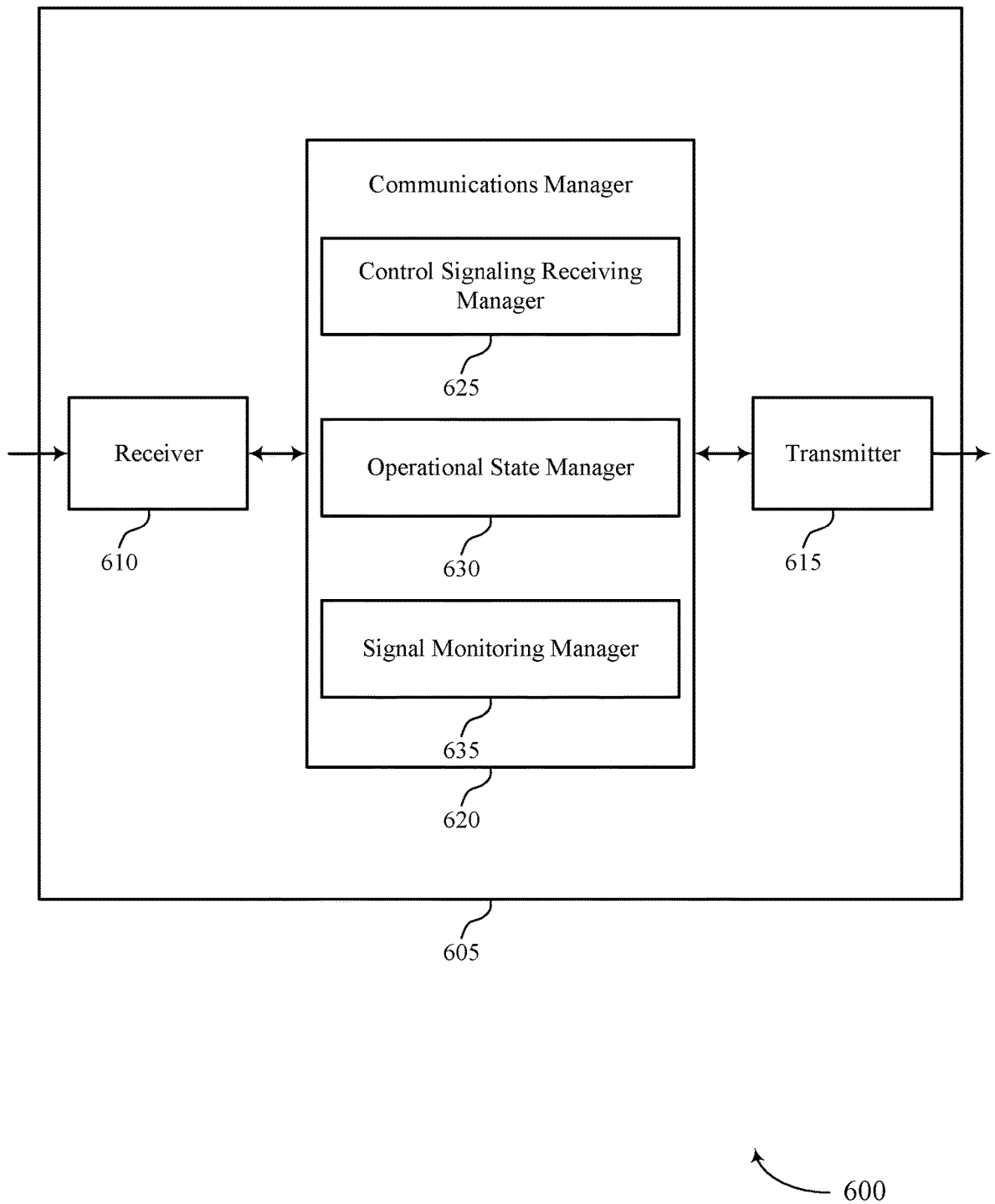

FIG. 6 shows a block diagram 600 of a device 605 that supports techniques for communicating satellite revisit time in an NTN in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for communicating satellite revisit time in an NTN). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for communicating satellite revisit time in an NTN). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for communicating satellite revisit time in an NTN as described herein. For example, the communications manager 620 may include a control signaling receiving manager 625, an operational state manager 630, a signal monitoring manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The control signaling receiving manager 625 may be configured as or otherwise support a means for receiving control signaling indicating a satellite visit time associated with one or more satellites. The operational state manager 630 may be configured as or otherwise support a means for operating in an idle state, an inactive state, or a power-saving state for a time interval which is based on the satellite visit time. The signal monitoring manager 635 may be configured as or otherwise support a means for monitoring for one or more broadcast signals associated with the one or more satellites, one or more base stations, or both, following an end of the time interval which is based on the satellite visit time.

Figure 7:
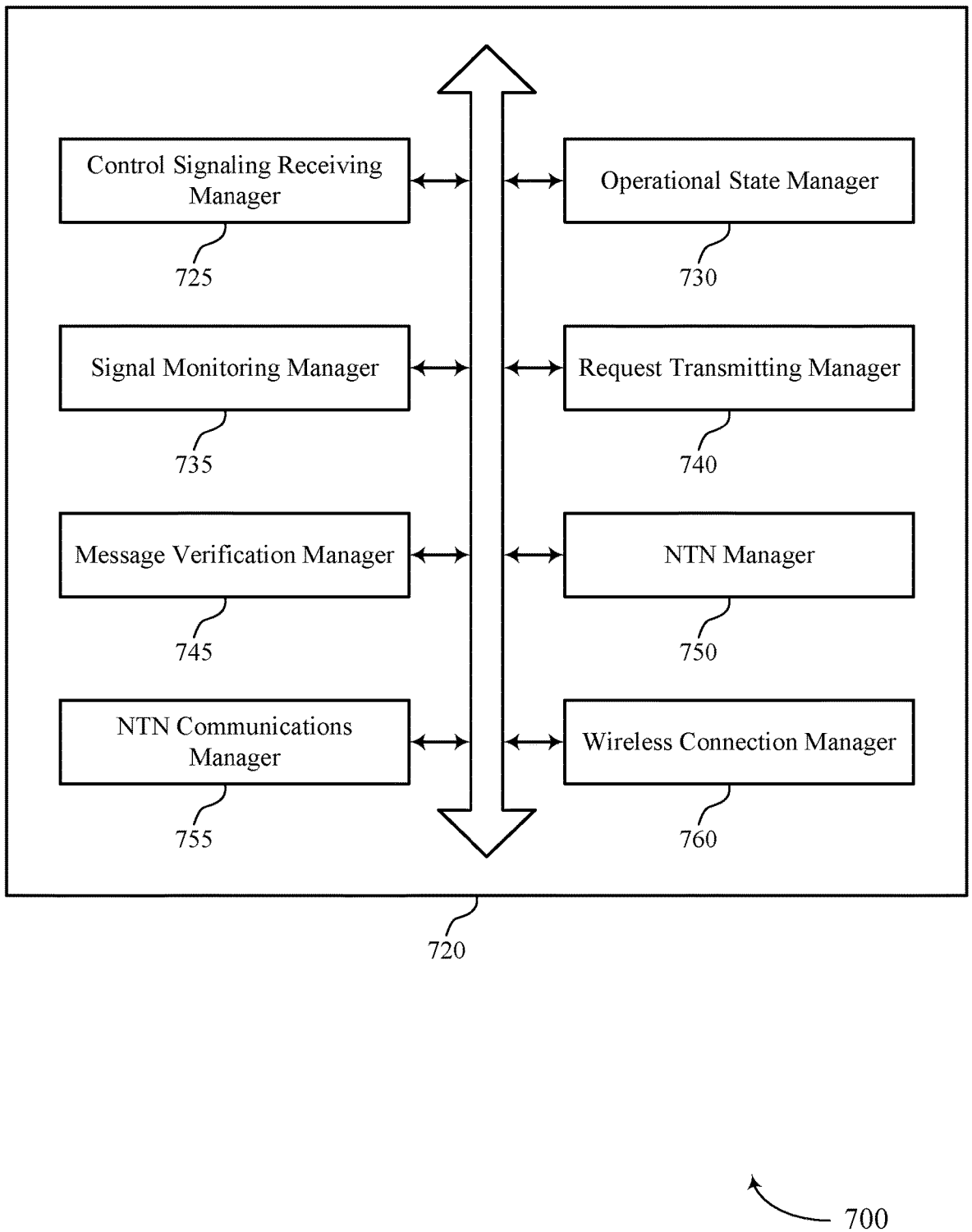
FIG. 7 shows a block diagram of a communications manager that supports techniques for communicating satellite revisit time in an NTN in accordance with aspects of the present disclosure.

FIG. 7 shows a block diagram 700 of a communications manager 720 that supports techniques for communicating satellite revisit time in an NTN in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for communicating satellite revisit time in an NTN as described herein. For example, the communications manager 720 may include a control signaling receiving manager 725, an operational state manager 730, a signal monitoring manager 735, a request transmitting manager 740, a message verification manager 745, an NTN manager 750, an NTN communications manager 755, a wireless connection manager 760, or any combination thereof. Each of these components may communicate, directly or indirectly, with one another (e.g., via one or more buses).

The communications manager 720 may support wireless communication at a UE in accordance with examples as disclosed herein. The control signaling receiving manager 725 may be configured as or otherwise support a means for receiving control signaling indicating a satellite visit time associated with one or more satellites. The operational state manager 730 may be configured as or otherwise support a means for operating in an idle state, an inactive state, or a power-saving state for a time interval which is based on the satellite visit time. The signal monitoring manager 735 may be configured as or otherwise support a means for monitoring for one or more broadcast signals associated with the one or more satellites, one or more base stations, or both, following an end of the time interval which is based on the satellite visit time.

In some examples, the control signaling receiving manager 725 may be configured as or otherwise support a means for receiving, via the control signaling, a reference time associated with the satellite visit time, or a reference location associated with the satellite visit time, or both, where the satellite visit time indicates a time of a subsequent visiting satellite of an NTN relative to the reference time, or a location of the subsequent visiting satellite relative to the reference location, or both, where monitoring for the one or more broadcast signals is based on the reference time, the reference location, or both.

In some examples, the signal monitoring manager 735 may be configured as or otherwise support a means for monitoring for the one or more broadcast signals based on a comparison of an identified location associated with the UE and the reference location.

In some examples, the reference time includes a cell termination time associated with a cell of the NTN, an SFN associated with the NTN, or both. In some examples, the reference location includes a location of a beam center associated with a beam used by the NTN to transmit the control signaling, a reference geographical location, or both.

In some examples, the control signaling receiving manager 725 may be configured as or otherwise support a means for receiving, via the control signaling, an elevation angle associated with the satellite visit time, where the satellite visit time indicates an elevation of a subsequent visiting satellite of an NTN relative to the elevation angle, where monitoring for the one or more broadcast signals is based on the elevation angle.

In some examples, the control signaling receiving manager 725 may be configured as or otherwise support a means for receiving, via the control signaling, an indication of a set of multiple satellite visit times associated with an NTN, the set of multiple satellite visit times including the satellite visit time, where monitoring for the one or more broadcast signals is based on the set of multiple satellite visit times.

In some examples, the control signaling receiving manager 725 may be configured as or otherwise support a means for receiving, via the control signaling, an indication of a second satellite visit time of the set of multiple satellite visit times, wherein the second satellite visit time is subsequent to the satellite visit time, where the second satellite visit time includes a time offset relative to the satellite visit time.

In some examples, the control signaling receiving manager 725 may be configured as or otherwise support a means for receiving, via the control signaling, an indication of one or more parameters associated with each satellite visit time of the set of multiple satellite visit times, the one or more parameters including a reference time, a reference location, an elevation angle, a PCID, a satellite identifier, a PLMN, a terrestrial gateway, or any combination thereof.

In some examples, the signal monitoring manager 735 may be configured as or otherwise support a means for identifying an absence of signals associated with the NTN based on monitoring for the one or more broadcast signals. In some examples, the operational state manager 730 may be configured as or otherwise support a means for operating in one of the idle state, the inactive state, or the power-saving state for a second time interval which is based on a second satellite visit time included within the set of multiple satellite visit times. In some examples, the signal monitoring manager 735 may be configured as or otherwise support a means for monitoring for one or more broadcast signals associated with the one or more satellites, the one or more base stations, or both, following an end of the second time interval which is based on the second satellite visit time.

In some examples, the request transmitting manager 740 may be configured as or otherwise support a means for transmitting a request for the satellite visit time, a location report associated with the UE, or both, where the control signaling is received in response to the request, the location report, or both. In some examples, the request transmitting manager 740 may be configured as or otherwise support a means for transmitting, via the location report, discontinuous coverage information associated with the UE, where receiving the control signaling is based on the discontinuous coverage information.

In some examples, the message verification manager 745 may be configured as or otherwise support a means for verifying that the control signaling was received from an NTN based on a CRC, a signature check, or both, where operating in one of the idle state, the inactive state, or the power-saving state is based on the verifying.

In some examples, the control signaling receiving manager 725 may be configured as or otherwise support a means for receiving, via the control signaling, an indication of an uncertainty period associated with the satellite visit time, where monitoring for the one or more broadcast signals is based on the uncertainty period.

In some examples, the satellite visit time is associated with a first satellite corresponding to a first PLMN of an NTN, and the signal monitoring manager 735 may be configured as or otherwise support a means for monitoring for the one or more broadcast signals for at least the uncertainty period following the end of the time interval. In some examples, the satellite visit time is associated with a first satellite corresponding to a first PLMN of an NTN, and the signal monitoring manager 735 may be configured as or otherwise support a means for identifying an absence of signals associated with the NTN based on the monitoring for at least the uncertainty period. In some examples, the satellite visit time is associated with a first satellite corresponding to a first PLMN of an NTN, and the signal monitoring manager 735 may be configured as or otherwise support a means for monitoring for one or more broadcast signals associated with a second satellite corresponding to a second PLMN based on identifying the absence of signals.

In some examples, the signal monitoring manager 735 may be configured as or otherwise support a means for monitoring for the one or more broadcast signals for at least the uncertainty period following the end of the time interval. In some examples, the signal monitoring manager 735 may be configured as or otherwise support a means for identifying an absence of signals associated with an NTN based on the monitoring for at least the uncertainty period. In some examples, the wireless connection manager 760 may be configured as or otherwise support a means for performing one or more procedures associated with establishing a wireless connection with the NTN or another wireless communications network based on identifying the absence of signals. In some examples, the one or more procedures include a registration update procedure, a network detachment procedure, or both.

In some examples, the one or more procedures include a search procedure for one or more PLMNs that are different from a PLMN associated with the one or more satellites, a search procedure for one or more wireless devices that support a RAT that is different from a RAT supported by the one or more satellites, an estimation procedure for estimating an additional satellite visit time, or any combination thereof. In some examples, the uncertainty period includes a time duration, a number of paging cycles, a number of DRX cycles, or any combination thereof.

In some examples, the NTN manager 750 may be configured as or otherwise support a means for identifying a set of multiple candidate satellites of an NTN based on the monitoring. In some examples, the NTN manager 750 may be configured as or otherwise support a means for selecting a satellite from the set of multiple candidate satellites based on one or more parameters associated with the set of multiple candidate satellites, the UE, or both. In some examples, the NTN communications manager 755 may be configured as or otherwise support a means for communicating with the selected satellite.

In some examples, the one or more parameters include a location of the UE, a serving time associated with each respective candidate satellite of the set of multiple candidate satellites, a signal strength or quality associated with signals received from each respective candidate satellite of the set of multiple candidate satellites, or any combination thereof. In some examples, the control signaling includes system information which is broadcast by an NTN.

In some examples, the control signaling includes a RRC release message configured to release the UE from an active state to the idle state, the inactive state, or the power-saving state. In some examples, operating in one of the idle state, the inactive state, or the power-saving state is based on receiving the RRC release message. In some examples, the satellite visit time includes a coordinated universal time associated with a subsequent visiting satellite of an NTN.

In some examples, the satellite visit time is associated with a subsequent visiting satellite of an NTN, and the control signaling receiving manager 725 may be configured as or otherwise support a means for receiving the control signaling via a first satellite of the NTN, where the subsequent visiting satellite includes the first satellite or a second satellite of the NTN which is different from the first satellite.

Figure 8:
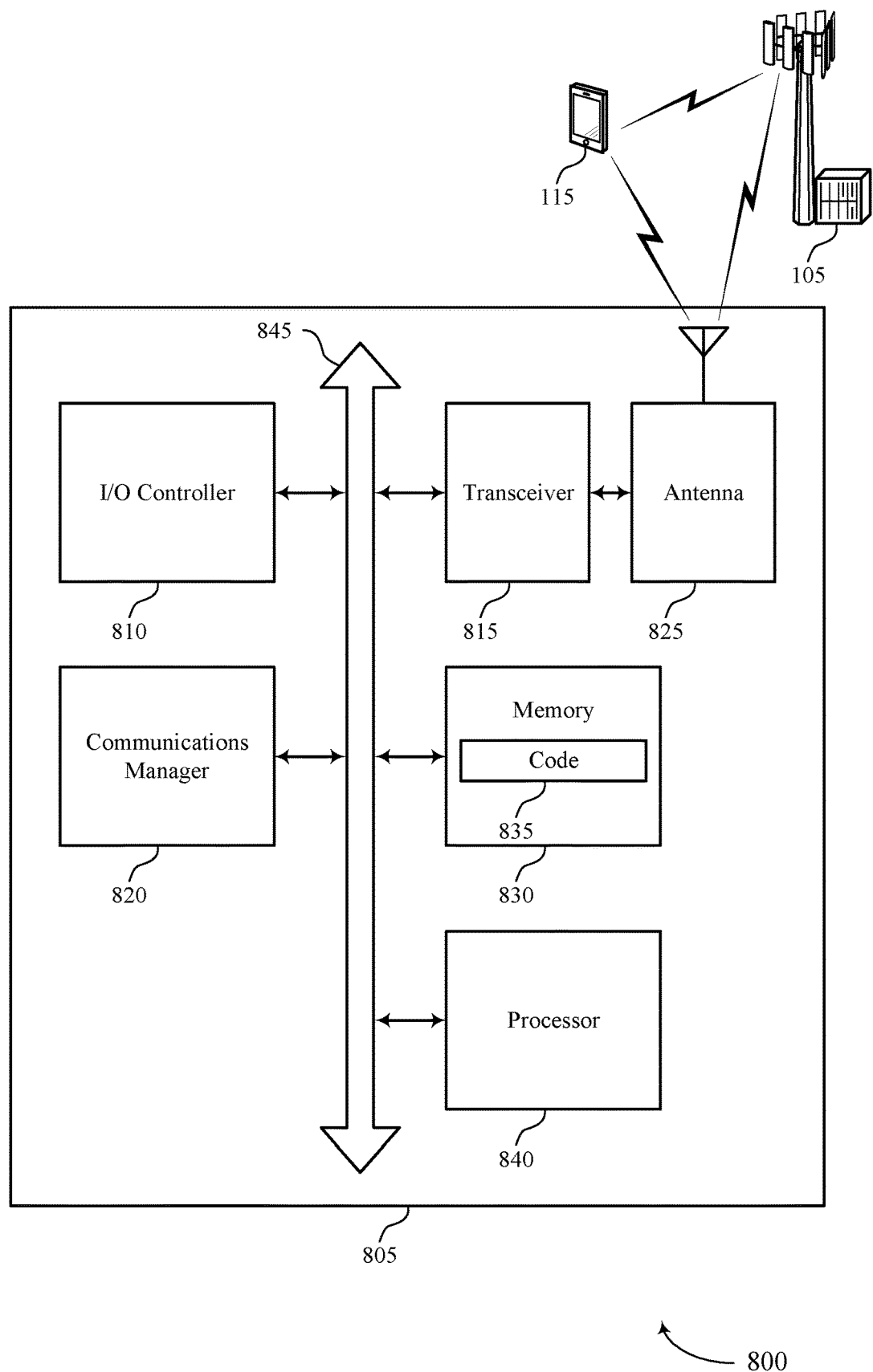
FIG. 8 shows a diagram of a system including a device that supports techniques for communicating satellite revisit time in an NTN in accordance with aspects of the present disclosure.

FIG. 8 shows a diagram of a system 800 including a device 805 that supports techniques for communicating satellite revisit time in an NTN in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for communicating satellite revisit time in an NTN). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving control signaling indicating a satellite visit time associated with one or more satellites. The communications manager 820 may be configured as or otherwise support a means for operating in an idle state, an inactive state, or a power-saving state for a time interval which is based on the satellite visit time. The communications manager 820 may be configured as or otherwise support a means for monitoring for one or more broadcast signals associated with the one or more satellites, one or more base stations, or both, following an end of the time interval which is based on the satellite visit time.

By including or configuring the communications manager 820 in accordance with examples as described herein, the device 805 may support techniques for signaling which enables UEs 115 to determine satellite visit times (e.g., satellite revisit times) associated with one or more satellites 120 of an NTN. By enabling a UE 115 to determine satellite visit times, techniques described herein may enable the UEs 115 to enter idle/inactive states during periods of time in which the UE 115 will be unable to communicate with the NTN, which may reduce power consumption and improve battery life of the UE 115. Moreover, techniques described herein may enable UEs 115 to perform one or more actions upon a satellite visit time in order to establish (e.g., re-establish) wireless communications with the NTN, which may further improve power consumption at the UEs 115 and lead to a more efficient use of wireless resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for communicating satellite revisit time in an NTN as described herein, or the processor 840 and the memory 830 may be otherwise configured to perform or support such operations.

Figure 9:
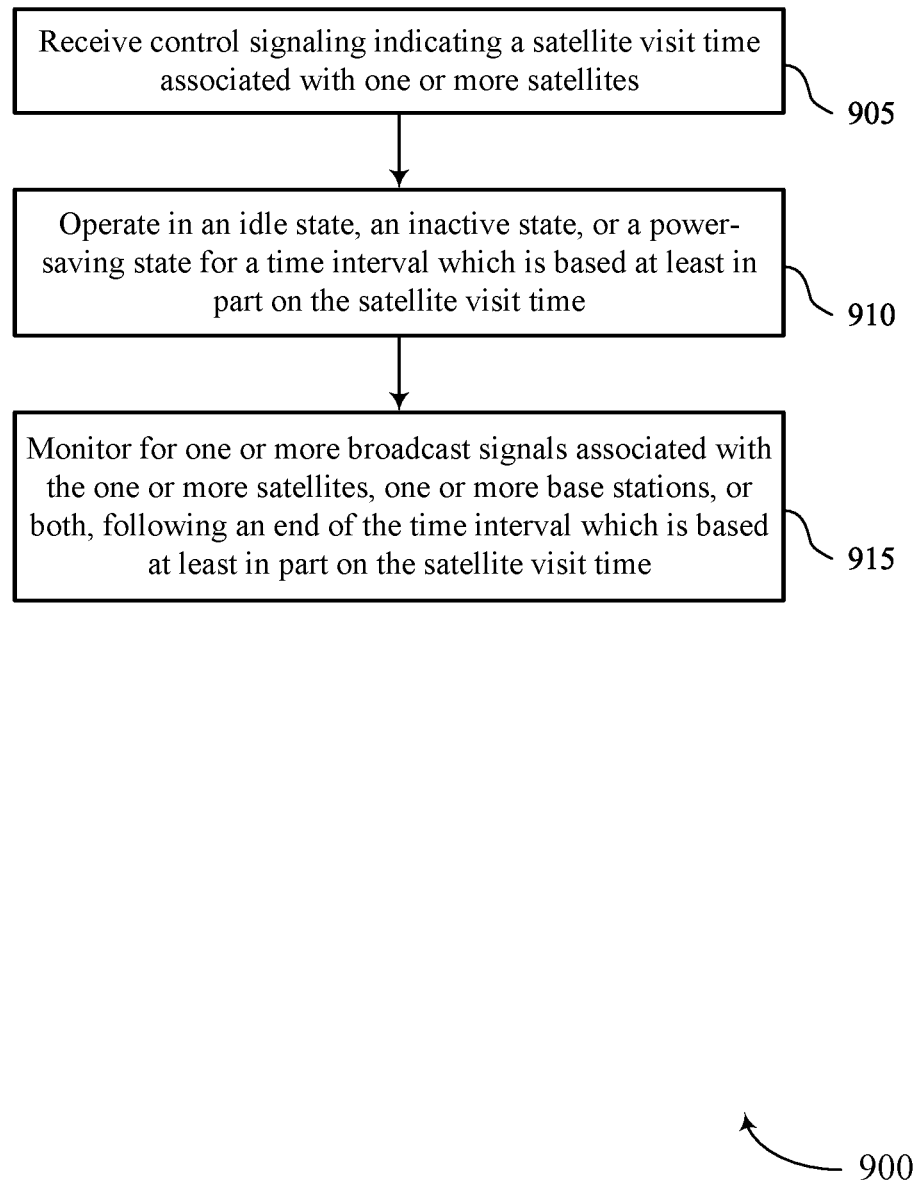
FIGS. 9 through 11 show flowcharts illustrating methods that support techniques for communicating satellite revisit time in an NTN in accordance with aspects of the present disclosure.

FIG. 9 shows a flowchart illustrating a method 900 that supports techniques for communicating satellite revisit time in an NTN in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving control signaling indicating a satellite visit time associated with one or more satellites. The operations of 905 may be performed in accordance with examples as disclosed herein. In some examples, aspects of the operations of 905 may be performed by a control signaling receiving manager 725 as described with reference to FIG. 7.

At 910, the method may include operating in an idle state, an inactive state, or a power-saving state for a time interval which is based on the satellite visit time. The operations of 910 may be performed in accordance with examples as disclosed herein. In some examples, aspects of the operations of 910 may be performed by an operational state manager 730 as described with reference to FIG. 7.

At 915, the method may include monitoring for one or more broadcast signals associated with the one or more satellites, one or more base stations, or both, following an end of the time interval which is based on the satellite visit time. The operations of 915 may be performed in accordance with examples as disclosed herein. In some examples, aspects of the operations of 915 may be performed by a signal monitoring manager 735 as described with reference to FIG. 7.

Figure 10:
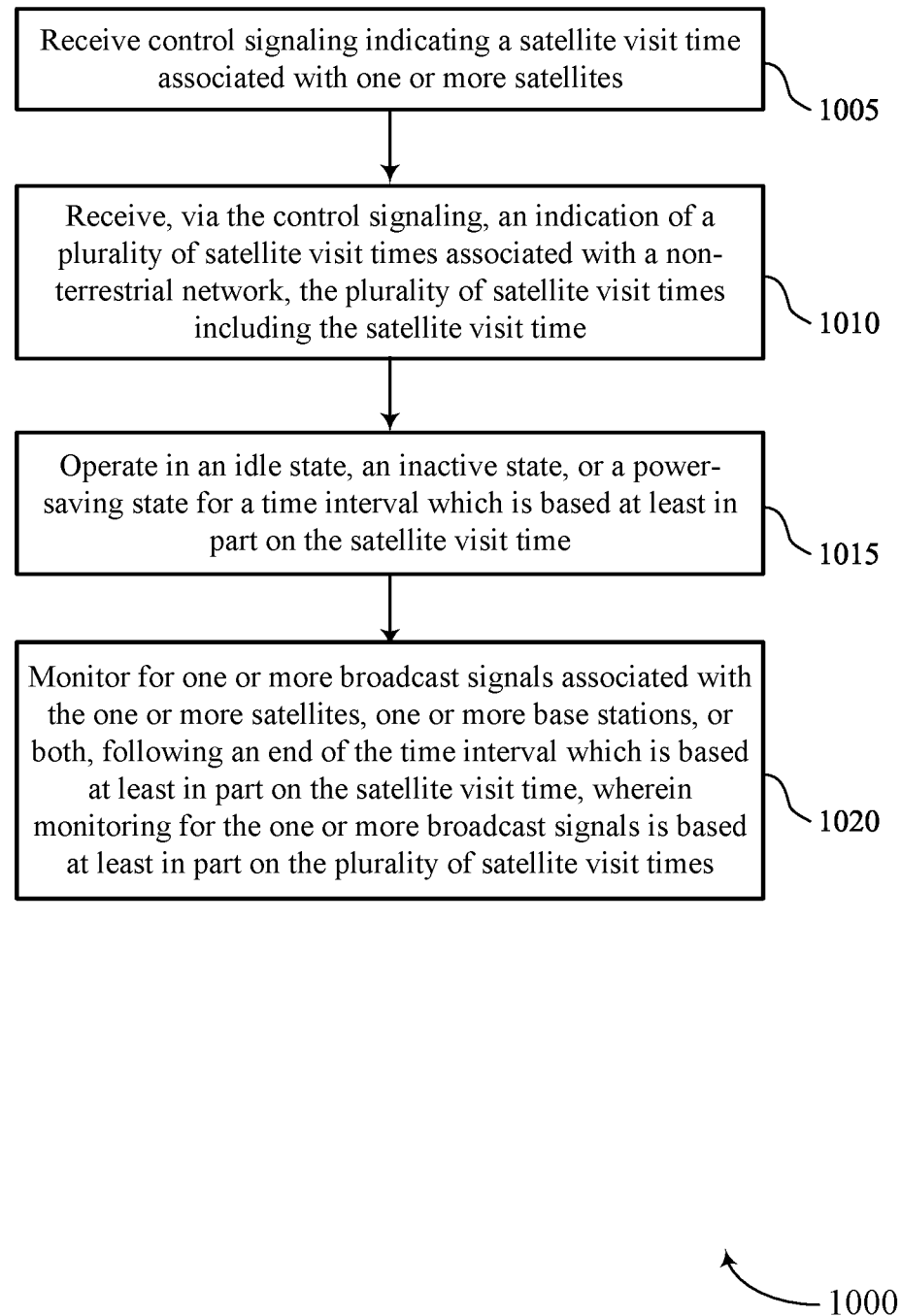

FIG. 10 shows a flowchart illustrating a method 1000 that supports techniques for communicating satellite revisit time in an NTN in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving control signaling indicating a satellite visit time associated with one or more satellites. The operations of 1005 may be performed in accordance with examples as disclosed herein. In some examples, aspects of the operations of 1005 may be performed by a control signaling receiving manager 725 as described with reference to FIG. 7.

At 1010, the method may include receiving, via the control signaling, an indication of a set of multiple satellite visit times associated with an NTN, the set of multiple satellite visit times including the satellite visit time. The operations of 1010 may be performed in accordance with examples as disclosed herein. In some examples, aspects of the operations of 1010 may be performed by a control signaling receiving manager 725 as described with reference to FIG. 7.

At 1015, the method may include operating in an idle state, an inactive state, or a power-saving state for a time interval which is based on the satellite visit time. The operations of 1015 may be performed in accordance with examples as disclosed herein. In some examples, aspects of the operations of 1015 may be performed by an operational state manager 730 as described with reference to FIG. 7.

At 1020, the method may include monitoring for one or more broadcast signals associated with the one or more satellites, one or more base stations, or both, following an end of the time interval which is based on the satellite visit time, where monitoring for the one or more broadcast signals is based on the set of multiple satellite visit times. The operations of 1020 may be performed in accordance with examples as disclosed herein. In some examples, aspects of the operations of 1020 may be performed by a signal monitoring manager 735 as described with reference to FIG. 7.

Figure 11:
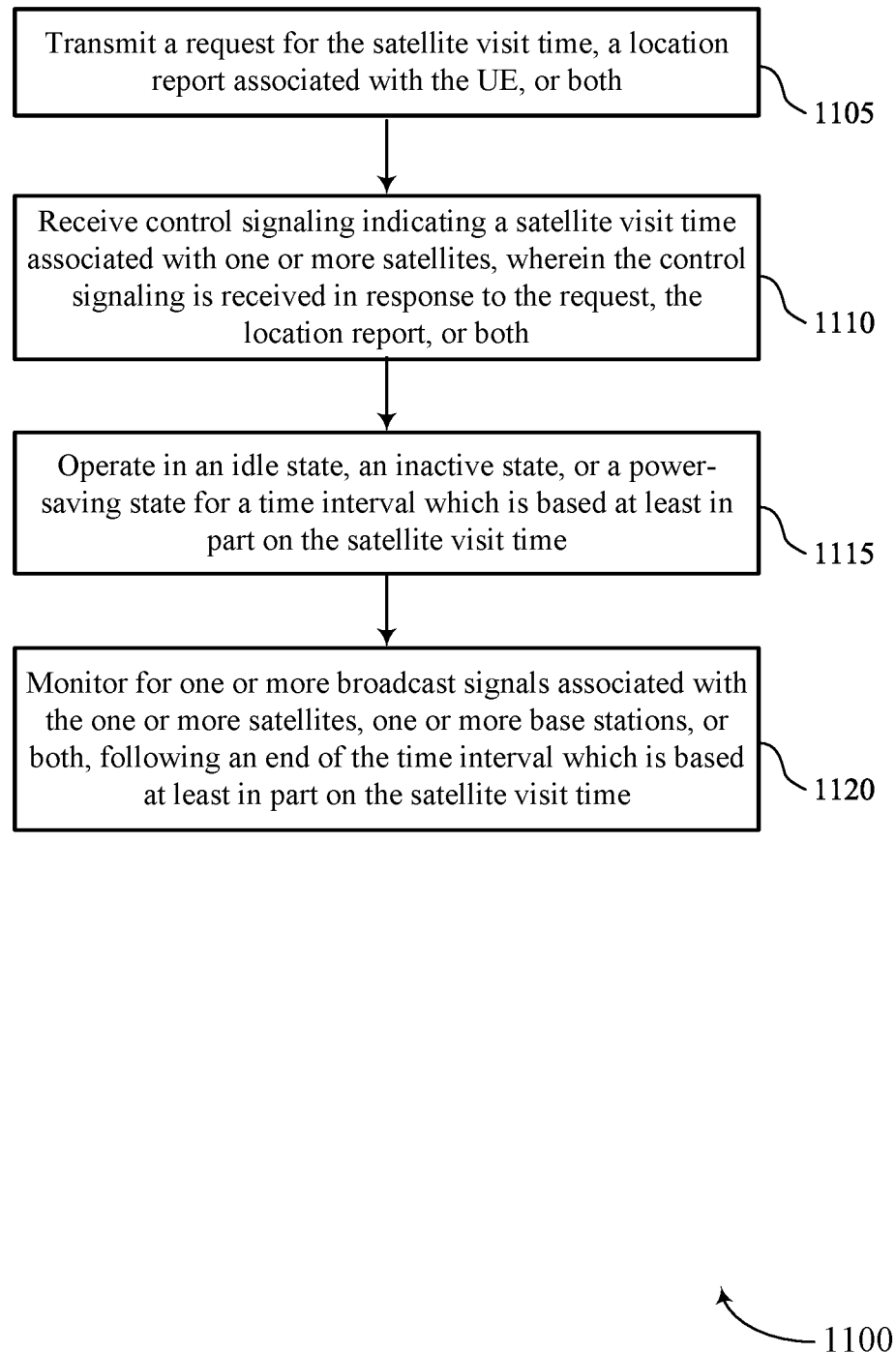

FIG. 11 shows a flowchart illustrating a method 1100 that supports techniques for communicating satellite revisit time in an NTN in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include transmitting a request for the satellite visit time, a location report associated with the UE, or both. The operations of 1105 may be performed in accordance with examples as disclosed herein. In some examples, aspects of the operations of 1105 may be performed by a request transmitting manager 740 as described with reference to FIG. 7.

At 1110, the method may include receiving control signaling indicating a satellite visit time associated with one or more satellites, where the control signaling is received in response to the request, the location report, or both. The operations of 1110 may be performed in accordance with examples as disclosed herein. In some examples, aspects of the operations of 1110 may be performed by a control signaling receiving manager 725 as described with reference to FIG. 7.

At 1115, the method may include operating in an idle state, an inactive state, or a power-saving state for a time interval which is based on the satellite visit time. The operations of 1115 may be performed in accordance with examples as disclosed herein. In some examples, aspects of the operations of 1115 may be performed by an operational state manager 730 as described with reference to FIG. 7.

At 1120, the method may include monitoring for one or more broadcast signals associated with the one or more satellites, one or more base stations, or both, following an end of the time interval which is based on the satellite visit time. The operations of 1120 may be performed in accordance with examples as disclosed herein. In some examples, aspects of the operations of 1120 may be performed by a signal monitoring manager 735 as described with reference to FIG. 7.

The following provides an overview of aspects of the present disclosure:

Aspect 1: A method for wireless communication at a UE, comprising: receiving control signaling indicating a satellite visit time associated with one or more satellites; operating in an idle state, an inactive state, or a power-saving state for a time interval which is based at least in part on the satellite visit time; and monitoring for one or more broadcast signals associated with the one or more satellites, one or more base stations, or both, following an end of the time interval which is based at least in part on the satellite visit time.

Aspect 2: The method of aspect 1, further comprising: receiving, via the control signaling, a reference time associated with the satellite visit time, or a reference location associated with the satellite visit time, or both, wherein the satellite visit time indicates a time of a subsequent visiting satellite of an NTN relative to the reference time, or a location of the subsequent visiting satellite relative to the reference location, or both, wherein monitoring for the one or more broadcast signals is based at least in part on the reference time, the reference location, or both.

Aspect 3: The method of aspect 2, further comprising: monitoring for the one or more broadcast signals based at least in part on a comparison of an identified location associated with the UE and the reference location.

Aspect 4: The method of any of aspects 2 through 3, wherein the reference time comprises a cell termination time associated with a cell of the NTN, an SFN associated with the NTN, or both.

Aspect 5: The method of any of aspects 2 through 4, wherein the reference location comprises a location of a beam center associated with a beam used by the NTN to transmit the control signaling, a reference geographical location, or both.

Aspect 6: The method of any of aspects 1 through 5, further comprising: receiving, via the control signaling, an elevation angle associated with the satellite visit time, wherein the satellite visit time indicates an elevation of a subsequent visiting satellite of an NTN relative to the elevation angle, wherein monitoring for the one or more broadcast signals is based at least in part on the elevation angle.

Aspect 7: The method of any of aspects 1 through 6, further comprising: receiving, via the control signaling, an indication of a plurality of satellite visit times associated with an NTN, the plurality of satellite visit times including the satellite visit time, wherein monitoring for the one or more broadcast signals is based at least in part on the plurality of satellite visit times.

Aspect 8: The method of aspect 7, further comprising: receiving, via the control signaling, an indication of a second satellite visit time of the plurality of satellite visit times, wherein the second satellite visit time is subsequent to the satellite visit time, wherein the second satellite visit time comprises a time offset relative to the satellite visit time.

Aspect 9: The method of any of aspects 7 through 8, further comprising: receiving, via the control signaling, an indication of one or more parameters associated with each satellite visit time of the plurality of satellite visit times, the one or more parameters comprising a reference time, a reference location, an elevation angle, a PCID, a satellite identifier, a PLMN, a terrestrial gateway, or any combination thereof.

Aspect 10: The method of any of aspects 7 through 9, further comprising: identifying an absence of signals associated with the NTN based at least in part on monitoring for the one or more broadcast signals; operating in one of the idle state, the inactive state, or the power-saving state for a second time interval which is based at least in part on a second satellite visit time included within the plurality of satellite visit times; and monitoring for one or more broadcast signals associated with the one or more satellites, the one or more base stations, or both, following an end of the second time interval which is based at least in part on the second satellite visit time.

Aspect 11: The method of any of aspects 1 through 10, further comprising: transmitting a request for the satellite visit time, a location report associated with the UE, or both, wherein the control signaling is received in response to the request, the location report, or both.

Aspect 12: The method of aspect 11, further comprising: transmitting, via the location report, discontinuous coverage information associated with the UE, wherein receiving the control signaling is based at least in part on the discontinuous coverage information.

Aspect 13: The method of any of aspects 1 through 12, further comprising: verifying that the control signaling was received from an NTN based at least in part on a CRC, a signature check, or both, wherein operating in one of the idle state, the inactive state, or the power-saving state is based at least in part on the verifying.

Aspect 14: The method of any of aspects 1 through 13, further comprising: receiving, via the control signaling, an indication of an uncertainty period associated with the satellite visit time, wherein monitoring for the one or more broadcast signals is based at least in part on the uncertainty period.

Aspect 15: The method of aspect 14, wherein the satellite visit time is associated with a first satellite corresponding to a first PLMN of an NTN, the method further comprising: monitoring for the one or more broadcast signals for at least the uncertainty period following the end of the time interval; identifying an absence of signals associated with the NTN based at least in part on the monitoring for at least the uncertainty period; and monitoring for one or more broadcast signals associated with a second satellite corresponding to a second PLMN based at least in part on identifying the absence of signals.

Aspect 16: The method of any of aspects 14 through 15, further comprising: monitoring for the one or more broadcast signals for at least the uncertainty period following the end of the time interval; identifying an absence of signals associated with an NTN based at least in part on the monitoring for at least the uncertainty period; and performing one or more procedures associated with establishing a wireless connection with the NTN or another wireless communications network based at least in part on identifying the absence of signals.

Aspect 17: The method of aspect 16, wherein the one or more procedures comprise a registration update procedure, a network detachment and attachment procedure upon detecting signals associated with the NTN or the other wireless communications network, or both.

Aspect 18: The method of any of aspects 16 through 17, wherein the one or more procedures comprise a search procedure for one or more PLMNs that are different from a PLMN associated with the one or more satellites, a search procedure for one or more wireless devices that support a RAT that is different from a RAT supported by the one or more satellites, an estimation procedure for estimating an additional satellite visit time, or any combination thereof.

Aspect 19: The method of any of aspects 14 through 18, wherein the uncertainty period comprises a time duration, a number of paging cycles, a number of DRX cycles, or any combination thereof.

Aspect 20: The method of any of aspects 1 through 19, further comprising: identifying a plurality of candidate satellites of an NTN based at least in part on the monitoring; selecting a satellite from the plurality of candidate satellites based at least in part on one or more parameters associated with the plurality of candidate satellites, the UE, or both; and communicating with the selected satellite.

Aspect 21: The method of aspect 20, wherein the one or more parameters comprise a location of the UE, a serving time associated with each respective candidate satellite of the plurality of candidate satellites, a signal strength or quality associated with signals received from each respective candidate satellite of the plurality of candidate satellites, or any combination thereof.

Aspect 22: The method of any of aspects 1 through 21, wherein the control signaling comprises system information which is broadcast by an NTN, an RRC message received when the UE is in a connected state, a NAS message received when the UE is in the connected state, or any combination thereof.

Aspect 23: The method of any of aspects 1 through 22, wherein the control signaling comprises an RRC release message configured to release the UE from an active state to the idle state, the inactive state, or the power-saving state, and operating in one of the idle state, the inactive state, or the power-saving state is based at least in part on receiving the RRC release message.

Aspect 24: The method of any of aspects 1 through 23, wherein the satellite visit time comprises a coordinated universal time associated with a subsequent visiting satellite of an NTN.

Aspect 25: The method of any of aspects 1 through 24, wherein the satellite visit time is associated with a subsequent visiting satellite of an NTN, the method further comprising: receiving the control signaling via a first satellite of the NTN, wherein the subsequent visiting satellite comprises the first satellite or a second satellite of the NTN which is different from the first satellite.

Aspect 26: An apparatus for wireless communication at a UE, comprising a processor; memory coupled with the processor; and instructions stored in the memory and executable by the processor to cause the apparatus to perform a method of any of aspects 1 through 25.

Aspect 27: An apparatus for wireless communication at a UE, comprising at least one means for performing a method of any of aspects 1 through 25.

Aspect 28: A non-transitory computer-readable medium storing code for wireless communication at a UE, the code comprising instructions executable by a processor to perform a method of any of aspects 1 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

Additional disclosure and examples related to the present description are provided in the attached appendix.

What is claimed is:

1. An apparatus for wireless communication at a user equipment (UE), comprising:
    a processor;
    memory coupled with the processor; and
    instructions stored in the memory and executable by the processor to cause the apparatus to:
        receive control signaling indicating a satellite visit time associated with one or more satellites, the control signaling comprising an indication of a reference time associated with the satellite visit time, or a reference location associated with the satellite visit time, or both, wherein the satellite visit time indicates a time of a subsequent visiting satellite of a non-terrestrial network relative to the reference time, or a location of the subsequent visiting satellite relative to the reference location, or both;
        operate in an idle state, an inactive state, or a power-saving state for a time interval which is based at least in part on the satellite visit time; and
        monitor for one or more broadcast signals associated with the one or more satellites, one or more network entities, or both, following an end of the time interval which is based at least in part on the satellite visit time, wherein monitoring for the one or more broadcast signals is based at least in part on the reference time, the reference location, or both.

2. The apparatus of claim 1, wherein the instructions are further executable by the processor to cause the apparatus to:
    monitor for the one or more broadcast signals based at least in part on a comparison of an identified location associated with the UE and the reference location.

3. The apparatus of claim 1, wherein the reference time comprises a cell termination time associated with a cell of the non-terrestrial network, a system frame number associated with the non-terrestrial network, or both.

4. The apparatus of claim 1, wherein the reference location comprises a location of a beam center associated with a beam used by the non-terrestrial network to transmit the control signaling, a reference geographical location, or both.

5. The apparatus of claim 1, wherein the instructions are further executable by the processor to cause the apparatus to:
    receive, via the control signaling, an elevation angle associated with the satellite visit time, wherein the satellite visit time indicates an elevation of a subsequent visiting satellite of a non-terrestrial network relative to the elevation angle, wherein monitoring for the one or more broadcast signals is based at least in part on the elevation angle.

6. The apparatus of claim 1, wherein the satellite visit time comprises a coordinated universal time associated with a subsequent visiting satellite of a non-terrestrial network.

7. The apparatus of claim 1, wherein the instructions are further executable by the processor to cause the apparatus to:
    receive, via the control signaling, an indication of a second satellite visit time, wherein the second satellite visit time is subsequent to the satellite visit time, and wherein the second satellite visit time comprises a time offset relative to the satellite visit time.

8. The apparatus of claim 1, wherein the instructions are further executable by the processor to cause the apparatus to:
    receive, via the control signaling, an indication of a plurality of satellite visit times associated with a non-terrestrial network, the plurality of satellite visit times including the satellite visit time, wherein monitoring for the one or more broadcast signals is based at least in part on the plurality of satellite visit times.

9. The apparatus of claim 8, wherein the instructions are further executable by the processor to cause the apparatus to:
    receive, via the control signaling, an indication of one or more parameters associated with each satellite visit time of the plurality of satellite visit times, the one or more parameters comprising a reference time, a reference location, an elevation angle, a physical cell identifier, a satellite identifier, a public land mobile network, a terrestrial gateway, or any combination thereof.

10. The apparatus of claim 8, wherein the instructions are further executable by the processor to cause the apparatus to:
    identify an absence of signals associated with the non-terrestrial network based at least in part on monitoring for the one or more broadcast signals;

operate in the idle state, the inactive state, or the power-saving state for a second time interval which is based at least in part on a second satellite visit time included within the plurality of satellite visit times; and monitor for one or more broadcast signals associated with the one or more satellites, the one or more network entities, or both, following an end of the second time interval which is based at least in part on the second satellite visit time.

11. The apparatus of claim 1, wherein the instructions are further executable by the processor to cause the apparatus to:
transmit a request for the satellite visit time, a location report associated with the UE, or both, wherein the control signaling is received in response to the request, the location report, or both.

12. The apparatus of claim 11, wherein the instructions are further executable by the processor to cause the apparatus to:
transmit, via the location report, discontinuous coverage information associated with the UE, wherein receiving the control signaling is based at least in part on the discontinuous coverage information.

13. The apparatus of claim 1, wherein the instructions are further executable by the processor to cause the apparatus to:
verify that the control signaling was received from a non-terrestrial network based at least in part on a cyclic redundancy check, a signature check, or both, wherein operating in one of the idle state, the inactive state, or the power-saving state is based at least in part on the verifying.

14. The apparatus of claim 1, wherein the instructions are further executable by the processor to cause the apparatus to:
receive, via the control signaling, an indication of an uncertainty period associated with the satellite visit time, wherein monitoring for the one or more broadcast signals is based at least in part on the uncertainty period.

15. The apparatus of claim 14, wherein the satellite visit time is associated with a first satellite corresponding to a first public land mobile network of a non-terrestrial network, and the instructions are further executable by the processor to cause the apparatus to:
monitor for the one or more broadcast signals for at least the uncertainty period following the end of the time interval;
identify an absence of signals associated with the non-terrestrial network based at least in part on the monitoring for at least the uncertainty period; and
monitor for one or more broadcast signals associated with a second satellite corresponding to a second public land mobile network based at least in part on identifying the absence of signals.

16. The apparatus of claim 1, wherein the instructions are further executable by the processor to cause the apparatus to:
identify a plurality of candidate satellites of a non-terrestrial network based at least in part on the monitoring;
select a satellite from the plurality of candidate satellites based at least in part on one or more parameters associated with the plurality of candidate satellites, the UE, or both; and
communicate with the selected satellite.

17. The apparatus of claim 16, wherein the one or more parameters comprise a location of the UE, a serving time associated with each respective candidate satellite of the plurality of candidate satellites, a signal strength or quality associated with signals received from each respective candidate satellite of the plurality of candidate satellites, or any combination thereof.

18. The apparatus of claim 1, wherein the control signaling comprises system information which is broadcast by a non-terrestrial network, a radio resource control message received when the UE is in a connected state, a non-access stratum message received when the UE is in the connected state, or any combination thereof.

19. The apparatus of claim 1, wherein the control signaling comprises a radio resource control release message configured to release the UE from an active state to the idle state, the inactive state, or the power-saving state, and wherein operating in one of the idle state, the inactive state, or the power-saving state is based at least in part on receiving the radio resource control release message.

20. The apparatus of claim 1, wherein the satellite visit time is associated with a subsequent visiting satellite of a non-terrestrial network, and the instructions are further executable by the processor to cause the apparatus to:
receive the control signaling via a first satellite of the non-terrestrial network, wherein the subsequent visiting satellite comprises the first satellite or a second satellite of the non-terrestrial network which is different from the first satellite.

21. A method for wireless communication at a user equipment (UE), comprising:
receiving control signaling indicating a satellite visit time associated with one or more satellites, the control signaling comprising an indication of a reference time associated with the satellite visit time, or a reference location associated with the satellite visit time, or both, wherein the satellite visit time indicates a time of a subsequent visiting satellite of a non-terrestrial network relative to the reference time, or a location of the subsequent visiting satellite relative to the reference location, or both;
operating in an idle state, an inactive state, or a power-saving state for a time interval which is based at least in part on the satellite visit time; and
monitoring for one or more broadcast signals associated with the one or more satellites, one or more network entities, or both, following an end of the time interval which is based at least in part on the satellite visit time, wherein monitoring for the one or more broadcast signals is based at least in part on the reference time, the reference location, or both.

22. The method of claim 21, further comprising:
monitoring for the one or more broadcast signals based at least in part on a comparison of an identified location associated with the UE and the reference location.

23. The method of claim 21, further comprising:
receiving, via the control signaling, an elevation angle associated with the satellite visit time, wherein the satellite visit time indicates an elevation of a subsequent visiting satellite of a non-terrestrial network relative to the elevation angle, wherein monitoring for the one or more broadcast signals is based at least in part on the elevation angle.

24. The method of claim 21, further comprising:
receiving, via the control signaling, an indication of a second satellite visit time, wherein the second satellite visit time is subsequent to the satellite visit time, wherein the second satellite visit time comprises a time offset relative to the satellite visit time.

25. The method of claim 21, further comprising:
transmitting a request for the satellite visit time, a location report associated with the UE, or both, wherein the control signaling is received in response to the request, the location report, or both.

26. The method of claim 25, further comprising:
transmitting, via the location report, discontinuous coverage information associated with the UE, wherein receiving the control signaling is based at least in part on the discontinuous coverage information.

27. An apparatus for wireless communication at a user equipment (UE), comprising:
means for receiving control signaling indicating a satellite visit time associated with one or more satellites, the control signaling comprising an indication of a reference time associated with the satellite visit time, or a reference location associated with the satellite visit time, or both, wherein the satellite visit time indicates a time of a subsequent visiting satellite of a non-terrestrial network relative to the reference time, or a location of the subsequent visiting satellite relative to the reference location, or both;
means for operating in an idle state, an inactive state, or a power-saving state for a time interval which is based at least in part on the satellite visit time; and
means for monitoring for one or more broadcast signals associated with the one or more satellites, one or more network entities, or both, following an end of the time interval which is based at least in part on the satellite visit time, wherein monitoring for the one or more broadcast signals is based at least in part on the reference time, the reference location, or both.

28. A non-transitory computer-readable medium storing code for wireless communication at a user equipment (UE), the code comprising instructions executable by a processor to:
receive control signaling indicating a satellite visit time associated with one or more satellites, the control signaling comprising an indication of a reference time associated with the satellite visit time, or a reference location associated with the satellite visit time, or both, wherein the satellite visit time indicates a time of a subsequent visiting satellite of a non-terrestrial network relative to the reference time, or a location of the subsequent visiting satellite relative to the reference location, or both;
operate in an idle state, an inactive state, or a power-saving state for a time interval which is based at least in part on the satellite visit time; and
monitor for one or more broadcast signals associated with the one or more satellites, one or more network entities, or both, following an end of the time interval which is based at least in part on the satellite visit time, wherein monitoring for the one or more broadcast signals is based at least in part on the reference time, the reference location, or both.

* * * * *